US008798852B1

(12) United States Patent
Chen et al.

(10) Patent No.: US 8,798,852 B1
(45) Date of Patent: Aug. 5, 2014

(54) APPARATUS, SYSTEM, AND METHOD FOR AUTHENTICATION OF VEHICULAR COMPONENTS

(71) Applicant: Gogoro, Inc., New Taipei (TW)

(72) Inventors: Ching Chen, Taipei (TW); Matthew Whiting Taylor, North Bend, WA (US); Jui Sheng Huang, Taoyuan (TW); Hok-Sum Horace Luke, Mercer Island, WA (US)

(73) Assignee: Gogoro, Inc., New Taipei (TW)

( * ) Notice: Subject to any disclaimer, the term of this patent is extended or adjusted under 35 U.S.C. 154(b) by 0 days.

(21) Appl. No.: 13/918,703

(22) Filed: Jun. 14, 2013

Related U.S. Application Data

(60) Provisional application No. 61/783,041, filed on Mar. 14, 2013.

(51) Int. Cl.
*G06F 7/00* (2006.01)
*G07C 5/08* (2006.01)
*B60R 16/03* (2006.01)

(52) U.S. Cl.
CPC .............. *G07C 5/085* (2013.01); *B60R 16/0315* (2013.01)
USPC ........ 701/32.6; 701/29.6; 701/32.7; 701/34.4

(58) Field of Classification Search
USPC ............. 701/2, 36, 48, 29.1, 29.6, 31.4, 32.7, 701/34.4, 32.6; 714/25, 30, 37, 41, 51; 726/2, 5
See application file for complete search history.

(56) References Cited

U.S. PATENT DOCUMENTS

| 1,387,848 A | * | 8/1921 | Good ........................ 123/179.21 |
| 4,087,895 A | | 5/1978 | Etienne |

(Continued)

FOREIGN PATENT DOCUMENTS

| EP | 2 230 146 A2 | 9/2010 |
| JP | 7-031008 A | 1/1995 |

(Continued)

OTHER PUBLICATIONS

Chen et al., "Apparatus, Method and Article for Providing Vehicle Diagnostic Data," U.S. Appl. No. 61/601,404, filed Feb. 21, 2012, 56 pages.

(Continued)

*Primary Examiner* — Tuan C. To
*Assistant Examiner* — Dale W Hilgendorf
(74) *Attorney, Agent, or Firm* — Seed IP Law Group PLLC

(57) ABSTRACT

Manufacturers and original equipment manufacturers provide vehicles that include various components and systems that operate to provide safe, environmentally conscious transportation compliant with local, state, and federal requirements. Each of the components or systems may include a nontransitory storage media containing data indicative of an authentication code specific to the respective component or system. Authentication data may be communicated from each of the nontransitory storage media on a vehicle to a control system where the authentication data is compared to one or more defined criteria. If the one or more criteria confirm the validity of the authentication data supplied by the components or systems, full operation of one or more vehicular systems is permitted. If the one or more criteria fail to confirm the validity of the authentication data supplied by the components or systems, the operation of at least one vehicular system is at least partially inhibited.

22 Claims, 8 Drawing Sheets

(56) References Cited

U.S. PATENT DOCUMENTS

| | | |
|---|---|---|
| 4,216,839 A | 8/1980 | Gould et al. |
| 5,187,423 A | 2/1993 | Marton |
| 5,349,535 A | 9/1994 | Gupta |
| 5,596,261 A | 1/1997 | Suyama |
| 5,627,752 A | 5/1997 | Buck et al. |
| 5,631,536 A | 5/1997 | Tseng |
| 5,642,270 A | 6/1997 | Green et al. |
| 5,898,282 A | 4/1999 | Drozdz et al. |
| 5,998,963 A | 12/1999 | Aarseth |
| 6,016,882 A | 1/2000 | Ishikawa |
| 6,177,867 B1 | 1/2001 | Simon et al. |
| 6,177,879 B1 | 1/2001 | Kokubu et al. |
| 6,403,251 B1 | 6/2002 | Baggaley et al. |
| 6,515,580 B1 | 2/2003 | Isoda et al. |
| 6,822,560 B2 * | 11/2004 | Geber et al. ............. 340/439 |
| 6,952,795 B2 * | 10/2005 | O'Gorman et al. ............ 714/33 |
| 7,010,682 B2 * | 3/2006 | Reinold et al. .................... 701/1 |
| 7,131,005 B2 * | 10/2006 | Levenson et al. ........... 701/32.6 |
| 7,415,332 B2 * | 8/2008 | Ito et al. ....................... 701/29.6 |
| 7,567,166 B2 | 7/2009 | Bourgine De Meder |
| 7,778,746 B2 | 8/2010 | McLeod et al. |
| 7,898,439 B2 | 3/2011 | Bettez et al. |
| 7,908,020 B2 * | 3/2011 | Pieronek ......................... 700/19 |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,068,952 B2 | 11/2011 | Valentine et al. |
| 8,106,631 B2 | 1/2012 | Abe |
| 8,118,132 B2 | 2/2012 | Gray, Jr. |
| 8,164,300 B2 | 4/2012 | Agassi et al. |
| 8,229,625 B2 | 7/2012 | Lal et al. |
| 8,265,816 B1 | 9/2012 | LaFrance |
| 8,326,259 B2 | 12/2012 | Gautama et al. |
| 8,378,627 B2 | 2/2013 | Asada et al. |
| 8,412,401 B2 | 4/2013 | Bertosa et al. |
| 8,437,908 B2 | 5/2013 | Goff et al. |
| 2002/0070851 A1 | 6/2002 | Raichle et al. |
| 2003/0163434 A1 | 8/2003 | Barends |
| 2003/0209375 A1 | 11/2003 | Suzuki et al. |
| 2004/0236615 A1 | 11/2004 | Msndy |
| 2006/0047380 A1 | 3/2006 | Welch |
| 2007/0035397 A1 * | 2/2007 | Patenaude et al. ......... 340/572.1 |
| 2009/0024872 A1 | 1/2009 | Beverly |
| 2009/0082957 A1 | 3/2009 | Agassi et al. |
| 2009/0112394 A1 | 4/2009 | Lepejian et al. |
| 2010/0052588 A1 | 3/2010 | Okamura et al. |
| 2010/0089547 A1 | 4/2010 | King et al. |
| 2010/0094496 A1 | 4/2010 | Hershkovitz et al. |
| 2010/0201482 A1 | 8/2010 | Robertson et al. |
| 2011/0025267 A1 | 2/2011 | Kamen et al. |
| 2011/0029157 A1 | 2/2011 | Muzaffer |
| 2011/0071932 A1 | 3/2011 | Agassi et al. |
| 2011/0112710 A1 | 5/2011 | Meyer-Ebeling et al. |
| 2011/0114798 A1 | 5/2011 | Gemmati |
| 2011/0148346 A1 | 6/2011 | Gagosz et al. |
| 2011/0160992 A1 | 6/2011 | Crombez |
| 2011/0169447 A1 | 7/2011 | Brown et al. |
| 2011/0200193 A1 | 8/2011 | Blitz et al. |
| 2011/0202476 A1 | 8/2011 | Nagy et al. |
| 2011/0270480 A1 | 11/2011 | Ishibashi et al. |
| 2011/0303509 A1 | 12/2011 | Agassi et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0194346 A1 | 8/2012 | Tsai et al. |
| 2012/0248868 A1 | 10/2012 | Mobin et al. |
| 2012/0256588 A1 | 10/2012 | Hayashi et al. |
| 2012/0259665 A1 | 10/2012 | Pandhi et al. |
| 2012/0316671 A1 | 12/2012 | Hammerslag et al. |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0181582 A1 | 7/2013 | Luke et al. |
| 2013/0254097 A1 | 9/2013 | Marathe et al. |
| 2013/0282254 A1 | 10/2013 | Dwan et al. |
| 2014/0028089 A1 | 1/2014 | Luke et al. |

FOREIGN PATENT DOCUMENTS

| | | |
|---|---|---|
| JP | 7-36504 U | 7/1995 |
| JP | 9-119839 A | 5/1997 |
| JP | 10-170293 A | 6/1998 |
| JP | 10-307952 A | 11/1998 |
| JP | 11-049079 A | 2/1999 |
| JP | 11-51681 A | 2/1999 |
| JP | 11-176487 A | 7/1999 |
| JP | 11-205914 A | 7/1999 |
| JP | 2000-102102 A | 4/2000 |
| JP | 2000-102103 A | 4/2000 |
| JP | 2000-341868 A | 12/2000 |
| JP | 2001-128301 A | 5/2001 |
| JP | 2003-118397 A | 4/2003 |
| JP | 2003262525 A | 9/2003 |
| JP | 2005-67453 A | 3/2005 |
| JP | 2009171646 A | 7/2009 |
| JP | 2009171647 A | 7/2009 |
| JP | 4319289 B2 | 8/2009 |
| JP | 2010191636 A | 9/2010 |
| JP | 2010200405 A | 9/2010 |
| JP | 2011-126452 A | 6/2011 |
| KR | 1998-045020 U | 9/1998 |
| KR | 2004-0005146 A | 1/2004 |
| KR | 20100012401 A | 2/2010 |
| KR | 10-0971278 B1 | 7/2010 |
| KR | 20110004292 A | 1/2011 |
| KR | 20110041783 A | 4/2011 |
| TW | 200836452 A | 9/2008 |
| TW | I315116 B | 9/2009 |
| TW | M371880 | 1/2010 |
| TW | M379269 | 4/2010 |
| TW | M379789 U1 | 5/2010 |
| TW | M385047 | 7/2010 |
| TW | 201043986 A | 12/2010 |
| TW | 201044266 A | 12/2010 |
| WO | 2009/039454 A1 | 3/2009 |
| WO | 2010/033517 A2 | 3/2010 |
| WO | 2010/143483 A1 | 12/2010 |
| WO | 2012/160407 A1 | 11/2012 |
| WO | 2012/160557 A2 | 11/2012 |
| WO | 2013/024483 A2 | 2/2013 |
| WO | 2013/024484 A1 | 2/2013 |
| WO | 2013/080211 A1 | 6/2013 |
| WO | 2013/102894 A1 | 7/2013 |
| WO | 2013/108246 A2 | 7/2013 |
| WO | 2013/118113 A2 | 8/2013 |
| WO | 2013/144951 A1 | 10/2013 |

OTHER PUBLICATIONS

Luke et al., "Dynamically Limiting Vehicle Operation for Best Effort Economy," U.S. Appl. No. 61/511,880, filed Jul. 26, 2011, 52 pages.

(56) References Cited

OTHER PUBLICATIONS

Luke et al., "Thermal Management of Components in Electric Motor Drive Vehicles," U.S. Appl. No. 61/511,887, filed Jul. 26, 2011, 44 pages.
Luke et al., "Apparatus, Method and Article for Collection, Charging and Distributing Power Storage Device, Such as Batteries," U.S. Appl. No. 61/511,900, filed Jul. 26, 2011, 73 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Improved Drive Assembly for Electric Device," U.S. Appl. No. 13/650,392, filed Oct. 12, 2012, 43 pages.
Luke et al., "Thermal Management of Components in Electric Motor Drive Vehicles," U.S. Appl. No. 61/647,941, filed May 16, 2012, 47 pages.
Taylor et al., "Apparatus, Method and Article for Physical Security of Power Storage Devices in Vehicles," U.S. Appl. No. 61/557,170, filed Nov. 8, 2011, 60 pages.
Wu et al., "Apparatus, Method and Article for Security of Vehicles," U.S. Appl. No. 61/557,176, filed Nov. 8, 2011, 37 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
International Search Report and Written Opinion for corresponding International Patent Application No. PCT/US2012/048349, mailed Feb. 18, 2013, 9 pages.
International Search Report and Written Opinion for corresponding International Patent Application No. PCT/US2012/048354, mailed Feb. 18, 2013, 11 pages.
International Search Report and Written Opinion for corresponding International Patent Application No. PCT/US2012/048366 mailed Jan. 21, 2013, 10 pages.
International Search Report and Written Opinion for corresponding International Patent Application No. PCT/US2012/048367, mailed Jan. 17, 2013, 8 pages.
International Search Report and Written Opinion for corresponding International Patent Application No. PCT/US2012/048375, mailed Jan. 23, 2013, 9 pages.
International Search Report and Written Opinion for corresponding International Patent Application No. PCT/US2012/048379, mailed Dec. 17, 2012, 9 pages.
International Search Report and Written Opinion for corresponding International Application No. PCT/US2012/048391, mailed Dec. 21, 2012, 9 pages.
International Search Report and Written Opinion of the International Searching Authority for International Patent Application No. PCT/US2012/048358, dated Feb. 25, 2013, 9 pages.
Chen et al., "Apparatus, System, and Method for Authentication of Vehicular Components," U.S. Appl. No. 61/783,041, filed Mar. 14, 2013, 84 pages.
Chen et al., "Apparatus, Method and Article for Providing Vehicle Diagnostic Data," U.S. Appl. No. 14/022,134, filed Sep. 9, 2013, 61 pages.
Chen et al., "Apparatus, Method and Article for Providing Vehicle Diagnostic Data," Office Action mailed Dec. 30, 2013, for U.S. Appl. No. 14/022,134, 20 pages.
Huang et al., "Apparatus, Method and Article for Vehicle Turn Signals," U.S. Appl. No. 61/727,403, filed Nov. 16, 2012, 41 pages.
Huang et al., "Apparatus, Method and Article for Vehicle Turn Signals," U.S. Appl. No. 14/079,894, filed Nov. 14, 2013, 41 pages.
International Search Report and Written Opinion for corresponding International Patent Application No. PCT/US2012/048380, mailed Feb. 27, 2013, 9 pages.
International Search Report and Written Opinion for corresponding International Patent Application No. PCT/US2012/048382, mailed Feb. 27, 2013, 9 pages.
International Search Report and Written Opinion for corresponding International Patent Application No. PCT/US2012/063979, mailed Mar. 4, 2013, 10 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Authentication, Security and Control of Portable Charging Devices and Power Storage Devices, Such as Batteries," Office Action mailed Jan. 6, 2014, for U.S. Appl. No. 14/017,090, 19 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Detectible Indication of an Electric Motor Vehicle Standby Mode," Office Action for U.S. Appl. No. 13/646,320, mailed May 30, 2013, 13 pages.
Luke et al., "Drive Assembly for Electric Powered Device," U.S. Appl. No. 61/546,411, filed Oct. 12, 2011, 18 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Redistributing Power Storage Devices, Such as Batteries, Between Collection Charging and Distribution Machines," U.S. Appl. No. 13/559,091, filed Jul. 26, 2012, 69 pages.
Luke et al., "Detectible Indication of an Electric Motor Vehicle Standby Mode," U.S. Appl. No. 13/646,320, filed Oct. 5, 2012, 41 pages.
Luke et al., "Dynamically Limiting Vehicle Operation for Best Effort Economy," Office Action for U.S. Appl. No. 13/559,264, mailed Aug. 14, 2013, 21 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," Office Action for U.S. Appl. No. 14/017,081, mailed Jan. 30, 2014, 36 pages.
Luke, "Apparatus, Method and Article for Providing Information Regarding a Vehicle Via a Mobile Device," U.S. Appl. No. 61/780,781, filed Mar. 13, 2013, 80 pages.

(56) References Cited

OTHER PUBLICATIONS

Taylor et al., "Apparatus, Method and Article for Physical Security of Power Storage Devices in Vehicles," Notice of Allowance for U.S. Appl. No. 13/559,054, mailed May 30, 2013, 32 pages.

Taylor et al., "Apparatus, Method and Article for Physical Security of Power Storage Devices in Vehicles," Office Action for U.S. Appl. No. 13/559,054, mailed Dec. 3, 2012, 11 pages.

Taylor et al., "Apparatus, Method and Article for Physical Security of Power Storage Devices in Vehicles," U.S. Appl. No. 14/012,845, filed Aug. 28, 2013, 64 pages.

Wu et al., "Battery Configuration for an Electric Vehicle" U.S. Appl. No. 61/716388, filed Oct. 19, 2012, 37 pages.

Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.

Wu et al., "Apparatus, Method and Article for Providing Locations of Power Storage Device Collection, Charging and Distribution Machines," Office Action for U.S. Appl. No. 13/559,333, mailed Jul. 3, 2013, 14 pages.

Wu et al., "Apparatus, Method and Article for Providing Locations of Power Storage Device Collection, Charging and Distribution Machines," U.S. Appl. No. 14/022,147, filed Sep. 9, 2013, 56 pages.

Wu et al., "Apparatus, Method and Article for Providing Locations of Power Storage Device Collection, Charging and Distribution Machines," Office Action mailed Nov. 19, 2013, for U.S. Appl. No. 14/022,147, 10 pages.

Wu et al., "Apparatus, Method and Article for Providing Locations of Power Storage Device Collection, Charging and Distribution Machines," Office Action mailed Nov. 27, 2013, for U.S. Appl. No. 13/559,333, 19 pages.

Wu, "Battery Configuration for an Electric Vehicle," U.S. Appl. No. 14/057,405, filed Oct. 18, 2013, 38 pages.

\* cited by examiner

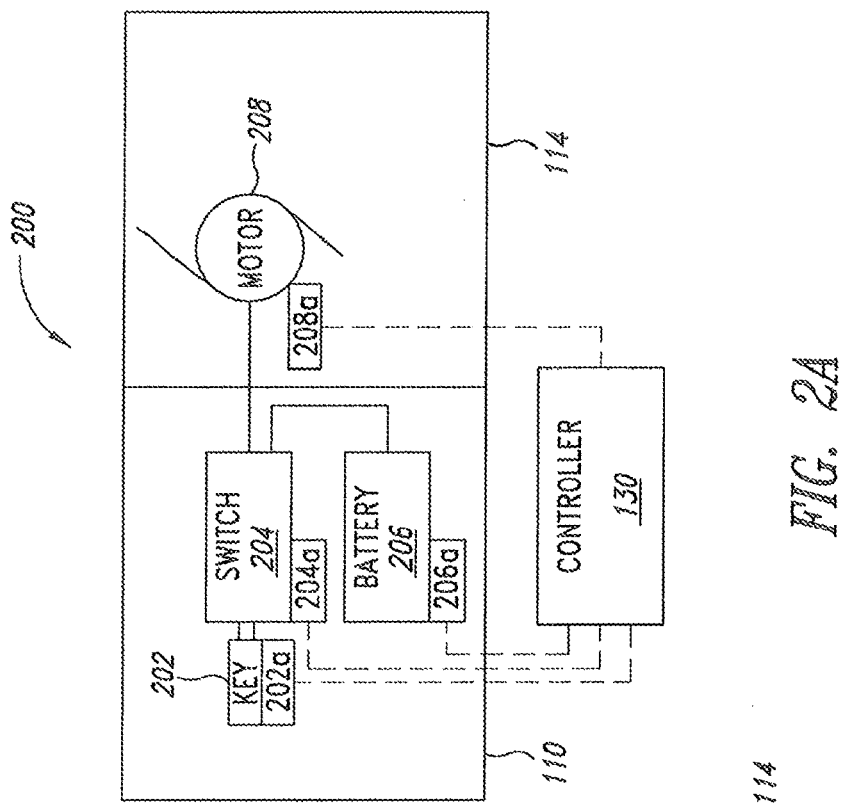
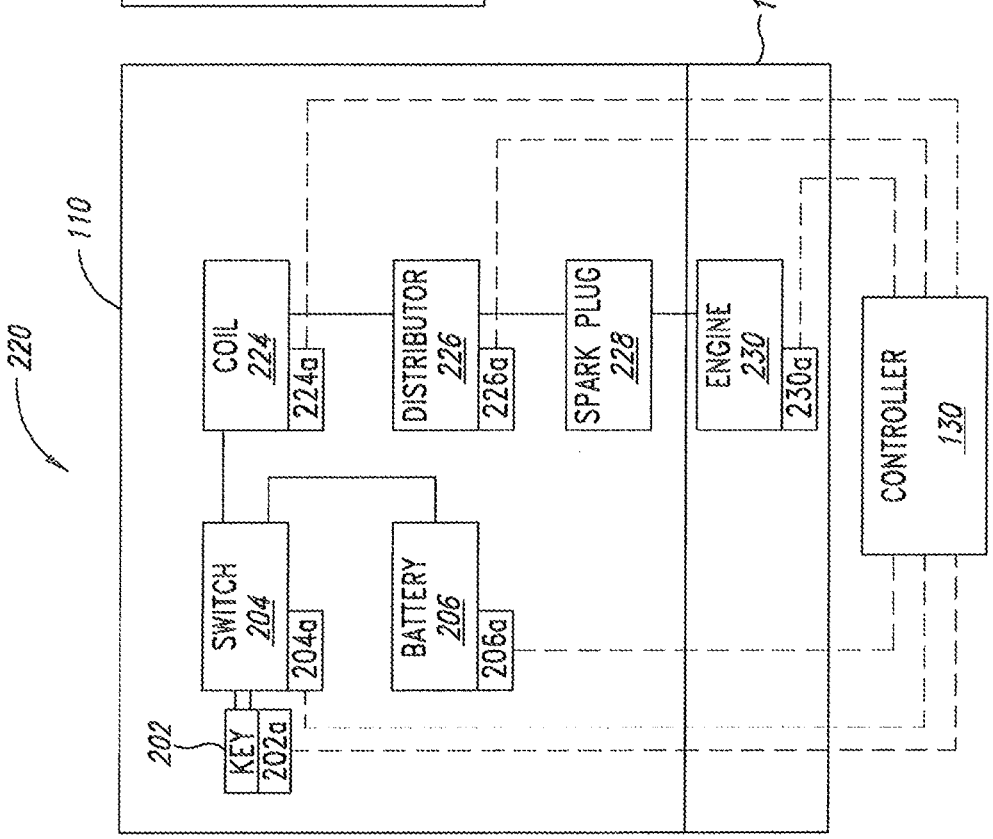
FIG. 2A
FIG. 2B

APPARATUS, SYSTEM, AND METHOD FOR AUTHENTICATION OF VEHICULAR COMPONENTS

BACKGROUND

1. Technical Field

The present disclosure generally relates to the authentication of vehicular components operably coupled to a vehicle.

2. Description of the Related Art

Even relatively simple vehicles such as scooters or motorbikes used in many densely populated urban areas throughout the world include a considerable number of systems that total hundreds of parts in aggregate. Vehicle manufacturers go to great lengths to ensure the quality, safety, low emissions, and performance of the vehicles they produce. For example, various components used in the drivetrain and exhaust systems may be selected and assembled in a manner that provides the greatest possible performance and reliability while minimizing the environmental footprint associated with the vehicle. It is axiomatic that such components and systems provide optimal functionality and performance when serviced and maintained with components and accessories that the manufacturer has supplied or approved for use with the vehicle. Unfortunately, such manufacturer or original equipment manufacturer ("OEM") parts and supplies may not be available, or may be economically unobtainable for many vehicle users. In such instances, lower cost new or used aftermarket replacement parts and supplies that do not meet manufacturer or OEM quality or performance standards may be substituted by the vehicle user simply to keep the vehicle operational. In some instances, components such as the catalytic converter or one or more safety interlocks may be removed entirely and the vehicle operated without one or more critical environmental or safety components or systems.

In densely populated urban areas, congestion, idling traffic and vehicles operating with substandard or missing components provide a recipe for noise, smog, and unhealthy levels of air pollution. While the use of hybrid and, more preferably, electric vehicles may be increasing in such areas, they too are susceptible to damage or safety concerns if manufacturer or OEM parts are replaced with substandard or used replacement components. Often electric vehicles offer a design that balances performance with range and energy demand. Since many systems on an electric vehicle share a common power source such as a battery, modifications made to one or more vehicular systems can deleteriously affect the performance of other on-board systems.

BRIEF SUMMARY

The decreasing size and cost of wireless and wired electronic data storage devices has enabled vehicle manufacturers in cooperation with original equipment manufacturers to physically couple electronic tags to many of the components used in a vehicle. Such tags may, for example, be attached to a number of component(s) (e.g., equipment control modules, motors, power cells, etc.) used in the gasoline or electric scooters seen in many urban areas worldwide. While tags containing nontransitory storage media provide an important means for a manufacturer or OEM to ensure the origin of parts sold in the market, with the growing use of control systems containing on-board electronic controllers and processors in all types of vehicles, such nontransitory storage media provides a convenient way to store data indicative of authentication information associated with vehicular components and systems. Such authentication information may be communicated to the vehicle control system for comparison to one or more defined criteria to determine whether the component or system is authorized by the manufacturer or OEM for use with the vehicle on which the component or system is coupled. Such authentication information may advantageously assist in ensuring that the components used in a vehicular system are safe, compatible, and provide performance at a level that is both appropriate and expected by the vehicle user.

In at least some instances, a number of electronic data storage devices containing authentication information may be disposed in, on, or about a respective number of vehicular components. Each of the number of electronic data storage devices may be wiredly or wirelessly communicably coupled to an on-board control system or a remote back end or back office system. The on-board control system or the remote back end or back office system can determine whether the vehicle or one or more vehicular systems are in at least one favorable authentication state or at least one unfavorable authentication state by comparing the received authentication information to at least one defined authentication criteria. Such authentication may be performed at various defined intervals (e.g., once every 60 minutes of operation), or upon occurrence of one or more events (e.g., initially starting the vehicle, replacing the battery in an electric vehicle, inactivity for a period of time, etc.). Such authentication may focus upon or include components in only one vehicular system (e.g., the electrical or ignition system) or may focus on and include components in any number of on-board mechanical, electrical, or electro-mechanical vehicular systems.

The on-board control system or remote back end or back office system may validate or otherwise confirm the authentication information received from the various vehicular components or systems with one or more defined criteria. Such defined criteria may be stored as digital data in one or more machine readable nontransitory storage that is communicably coupled to the control system. Such defined criteria may be stored as digital data in one or more machine readable data sets or data stores that are communicably coupled to the back end or back office system. In at least some instances, the defined criteria can include data indicative of whether the respective component is suitable for use with one or more other vehicular components or systems. Such suitability information may be provided in electronic format by the component or system manufacturer or OEM.

In at least some instances, responsive to the determination that the vehicular components or systems are at least partially suitable for use with the vehicle and/or other vehicle components or systems, the control system or back end or back office system may place the vehicle or vehicular system in a favorable authentication state in which some or all of the vehicular systems are permitted to perform at their respective full capacity. In other instances, responsive to the determination that a number of the vehicular components or systems are unsuitable for use with the vehicle and/or other vehicle components or systems, the control system or back end or back office system may place the vehicle or vehicular system in an unfavorable authentication state in which the performance of some or all of the vehicular systems may be partially or completely inhibited. In some instances, the vehicular system or degree of inhibition may be based in at least in part on the relative criticality of the unsuitable component or system and the impact that such an unsuitable component or system may have on vehicle operation. For example, responsive to the determination that one or more vehicular components or systems are able to safely operate in a reduced performance envelope, the controller may partially inhibit the operation of one or more vehicular systems such that overall vehicle performance remains within the reduced performance envelope. In another example, responsive to the determination that one or more vehicular components or systems are unable to operate without jeopardizing the safety of either the vehicle user or others, the controller may completely inhibit the operation of one or more vehicular systems to prevent operation of the vehicle in an unsafe condition.

For example, electronic storage devices may be disposed in, on, or about vehicular components such as an electronic control unit, a motor, an ignition key or keyfob, and power storage devices such as batteries used to power electric scooters and similar electric vehicles. Intermittently, for example each time the ignition key is inserted into the vehicle ignition or upon powering up or unlocking of the vehicle, authentication data is read from the electronic storage devices and compared by an on-board vehicular controller with stored authentication information or with authentication data from other electronic storage devices. Responsive to a successful authentication (e.g., all components containing electronic storage devices are authorized for use with the vehicle or by the vehicle owner), the vehicle is allowed to function normally. Responsive to an unsuccessful authentication (e.g., one or more components containing electronic storage devices are NOT authorized for use with the vehicle of by the vehicle owner), one or more operational aspects of one or more vehicular systems are limited or in some instances, prohibited. Such operational aspect limitations may result in the vehicle electrical system having only limited functionality (e.g., electrical systems may function but the electrical drive may not operate) or no functionality.

A system for authenticating components operably coupled to a vehicle may be summarized as including at least one controller; at least one communications interface communicably coupled to the at least one controller and to a plurality of nontransitory storage media, each of the plurality of nontransitory storage media physically coupled to a respective one of a plurality of components operably coupled to the vehicle, wherein the at least one communications interface: receives from each of the plurality of nontransitory storage media authentication data at least indicative of a suitability of the component coupled to the respective nontransitory storage media for use with one or more operational aspects of the vehicle; and communicates the authentication data received from each of the nontransitory storage media to the at least one controller; at least one controller-readable, nontransitory, storage communicably coupled to the at least one controller and containing at least one machine executable instruction set that when executed by the at least one controller, causes the at least one controller to: receive from the at least one communications interface the authentication data for each of the plurality of components operably coupled to the vehicle; compare the received authentication data with one or more defined criteria to determine whether each of the plurality of components is suitable for use with the vehicle based at least in part on the received authentication data associated with the respective component; at least partially inhibit operation of at least one vehicular system comprising a number of components responsive to the determination that at least one of the number of components comprising the at least one vehicular system is not suitable for use with the vehicle based at least in part on the received authentication data associated with the respective component; and permit full operation of the at least one vehicular system responsive to the determination that the number of components comprising the at least one vehicular system are suitable for use with the vehicle based at least in part on the received authentication data associated with the respective components.

Such cluster authentication may further include at least one human perceptible output device, wherein the machine executable instruction set, when executed by the at least one controller, further causes the controller to provide via the at least one human perceptible output device at least one of: a human perceptible audible output or a human perceptible visual output responsive to at least partially inhibiting operation of at least one vehicular system. The machine executable instruction set, when executed by the at least one controller, may further cause the controller to: inhibit operation of the vehicle responsive to the determination that at least one of a number of defined critical components is not suitable for use with the vehicle based at least in part on the received authentication data associated with the respective critical component. The machine executable instruction set, when executed by the at least one controller, may further cause the controller to: select a vehicle performance profile responsive to the determination that the number of components comprising the at least one vehicular system are suitable for use with the selected vehicle performance profile based at least in part on the received authentication data associated with the respective components. The at least one communications interface may be wirelessly communicably coupled to at least some of the plurality of nontransitory storage media. The authentication data for each of the plurality of components may be stored in a wirelessly readable nontransitory storage media in a respective one of the plurality of nontransitory storage media that is physically coupled to the respective component. The wirelessly readable nontransitory storage media may include at least one of: a radio frequency identification ("RFID") device including the nontransitory storage media, or a near field communications ("NFC") device including the nontransitory storage media. The at least one communications interface may be wiredly communicably coupled to at least some of the plurality of nontransitory storage media.

A method for authenticating a plurality of components operably coupled to a vehicle may be summarized as including receiving authentication data from each of a plurality of nontransitory storage media, each of the plurality of nontransitory storage media physically coupled to a respective one of a plurality of components operably coupled to the vehicle, the authentication data at least indicative of a suitability of the component coupled to the respective nontransitory storage media for use with one or more operational aspects of the vehicle; comparing the received authentication data with one or more defined criteria to determine whether each of the plurality of components is suitable for use with the vehicle and/or other vehicle components or systems based at least in part on the received authentication data associated with the respective component; at least partially inhibiting operation of at least one vehicular system responsive to the determination that at least one of the number of components comprising at least one vehicular system is unsuitable for use with the vehicle and/or other vehicle components or systems based at least in part on the received authentication data associated with the respective component; and permitting full operation of the at least one vehicular system responsive to the determination that the number of components comprising the at least one vehicular system are suitable for use with the vehicle and/or other vehicle components or systems based at least in part on the received authentication data associated with each of the respective number of components.

Such cluster authentication method may further include generating at least one human perceptible output responsive to the determination that at least one of the number of components comprising at least one vehicular system is unsuitable for use with the vehicle and/or other vehicle components or systems based at least in part on the received authentication data associated with the respective component. Generating at least one human perceptible output responsive to the determination that at least one of the number of components comprising at least one vehicular system is unsuitable for use with the vehicle and/or other vehicle components or systems may further include generating at least one human perceptible output indicative of the determined unsuitable component. The cluster authentication method may further include inhibiting operation of the vehicle responsive to the determination that at least one of a number of defined critical components is not suitable for use with the vehicle and/or other vehicle components or systems based at least in part on the received authentication data associated with the respective critical component. The cluster authentication method may further include selecting a vehicle performance profile responsive to the determination that the number of components comprising the at least one vehicular system are suitable for use with the vehicle performance profile based at least in part on the received authentication data associated with each of the respective number of components.

An authentication controller may be summarized as including at least one input to receive authentication data from each of a plurality of nontransitory storage media physically coupled to a respective one of a plurality of components operably coupled to a vehicle, the authentication data at least indicative of a suitability of the component coupled to the respective nontransitory media for use with one or more operational aspects of the vehicle and/or other vehicle components or systems; a nontransitory storage media containing one or more sets of machine executable instructions that when executed by the controller, cause the controller to: compare the received authentication data with one or more defined criteria to determine whether each of the plurality of components is suitable for use with the vehicle and/or other vehicle components or systems based at least in part on the received authentication data associated with the respective component; generate at least one first output, the at least one first output to at least partially inhibit operation of at least one vehicular system comprising a number of components responsive to the determination that at least one of the number of components comprising the at least one vehicular system is not suitable for use with the vehicle and/or other vehicle components or systems based at least in part on the received authentication data associated with the respective component; and generate at least one second output, the at least one second output to permit full operation of the at least one vehicular system responsive to the determination that the number of components comprising the at least one vehicular system are suitable for use with the vehicle and/or other vehicle components or systems based at least in part on the received authentication data associated with the respective components.

The one or more sets of machine executable instructions may further cause the controller to: generate at least one of: a human perceptible audible output or a human perceptible visual output responsive to at least partially inhibiting operation of at least one vehicular system. The one or more sets of machine executable instructions may further cause the controller to: select a vehicle performance profile responsive to the determination that the number of components comprising the at least one vehicular system are suitable for use with the selected vehicle performance profile based at least in part on the received authentication data associated with the respective components.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2A is a schematic view showing illustrative electric vehicle electrical, ignition, and powertrain systems that are communicably coupled to the at least one onboard controller, according to one non-limiting illustrated embodiment.

FIG. 2B is a schematic view showing illustrative internal combustion powered vehicle electrical, ignition, and powertrain systems that are communicably coupled to the at least one onboard controller, according to one non-limiting illustrated embodiment.

DETAILED DESCRIPTION

Figure 1:
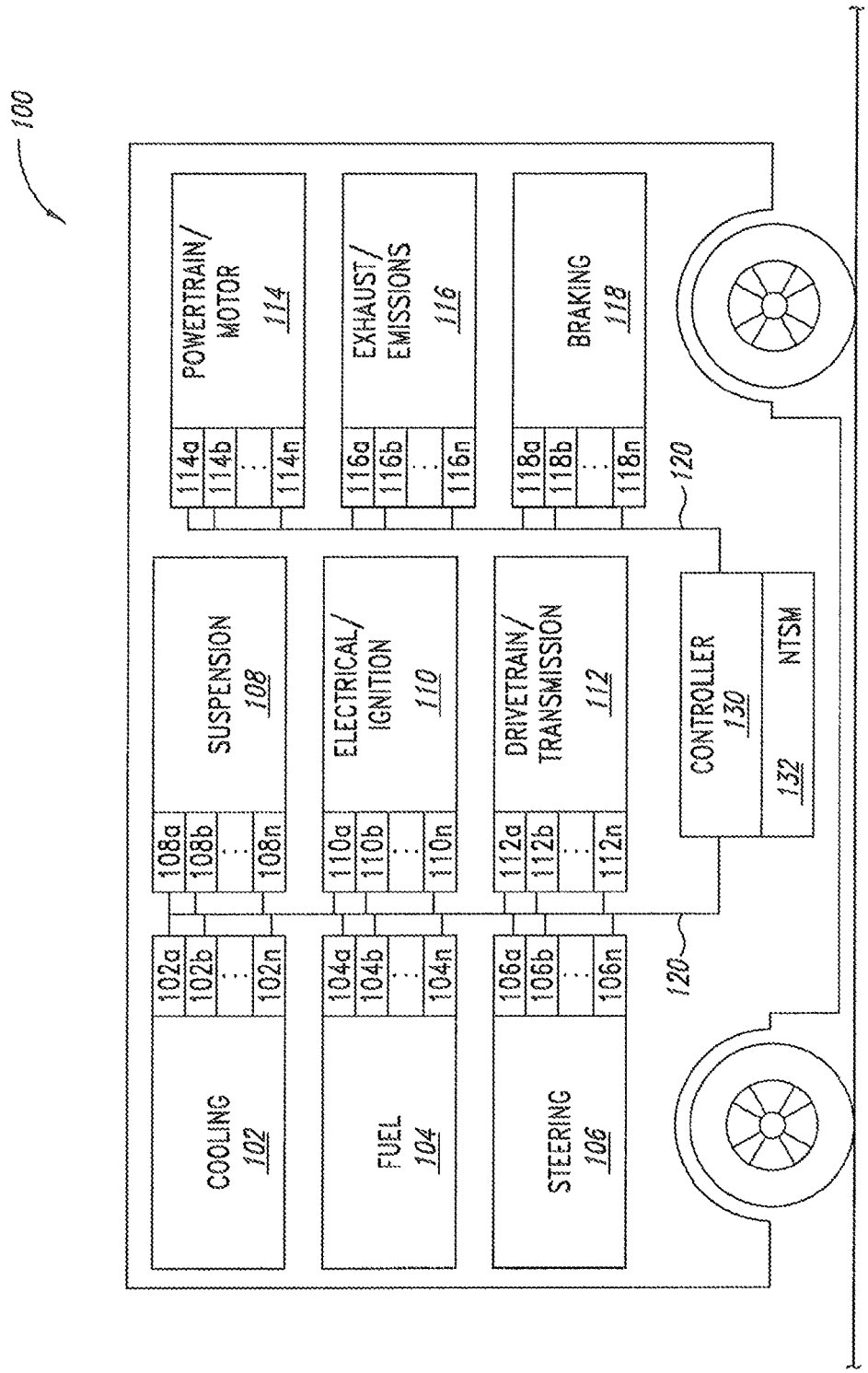
FIG. 1 is a schematic diagram showing a vehicle comprising a number of vehicular systems, with components communicably coupled to at least one on-board controller, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatuses or kiosks; energy storage devices such as batteries, supercapacitors or ultracapacitors; power converters including but not limited to transformers, rectifiers, DC/DC power converters, switch mode power converters; design and structure of vehicle components; wireless communications protocols; controllers, and communications systems and structures and networks have not been shown or described in detail to avoid unnecessarily obscuring descriptions of the embodiments.

As used herein, "operational aspects" or a reference to one or more "operational aspects" of a vehicle includes the performance or function of any combination or number of systems or devices forming all or a portion of the indicated system. For example, the operational aspects of a vehicular system may include, but are not limited to one or more of: the vehicle cooling system; vehicle fuel system, vehicle steering or directional control system, vehicle suspension, vehicle electrical and ignition system, vehicle drivetrain and power transmission system, vehicle powertrain or motor, vehicle exhaust or emissions, or vehicle braking. Thus an event impacting one or more operational aspects of a vehicle may impact the performance or functionality of one or more of the listed systems. In a similar manner, operational aspects of a vehicle electrical system may include, but are not limited to the performance or function of one or more components normally included in a vehicle electrical system, such as battery discharge rate, ignition, timing, electrical lamps, electrical systems, electrical instrumentation and the like. Thus, an event impacting one or more aspects of a vehicle electrical system may impact the performance or function of one or more electrical system components (e.g., limiting the discharge rate of a battery to limit vehicle speed, preventing the ignition system from starting the vehicle, etc.).

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

FIG. 1 shows a vehicle 100 including a number of components that are grouped and organized to provide a number of vehicular systems. Such vehicular systems may include one or more: cooling systems 102, fuel systems 104, steering or directional control systems 106, suspension systems 108 including tires or other devices contacting the surface upon which the vehicle is driven; electrical and ignition systems 110; drivetrain and power transmission systems 112; powertrain and power generation systems 114; exhaust or emissions control systems 116; and, braking systems 118. All of the above listed systems are illustrative of the diversity of vehicular systems and all of the listed systems may not be present on a single vehicle. Additionally, other components, for example vehicle interior components, vehicle body panels or similar components may not be explicitly included in the above systems, but should also be considered either alone or combined to provide one or more vehicular systems. For example, a vehicle such as an electric scooter powered by a battery or other energy storage device may not be equipped with a cooling system 102 or a fuel system 104, but may include bodywork or fenders that may independently comprise or form a portion of a vehicular system.

Each of the various vehicular systems 102-118 may include any number of components. For example, the ignition or electrical system 110 may include at least an ignition key, an ignition switch and a battery. In at least some instances, a nontransitory storage media may be physically coupled to some or all of the components included in one or more vehicular systems. As shown in FIG. 1, the nontransitory storage media attached to the cooling system components are labeled 102a . . . 102n. Other nontransitory storage media included in other vehicular systems are similarly identified. Each of the nontransitory storage media may be used to store volatile or non-volatile digital information.

In at least some instances, such digital information may include authentication information associated with the component or system to which the nontransitory storage media is physically coupled. In at least some instances, the authentication information may include digital data representative of a class or type of component (e.g., an "item" or "part" number or Universal Product Code assigned by the manufacturer or OEM). In at least some instances, the authentication information may include digital data able to uniquely identify the particular component or system from a group of similar or identical components or systems (e.g., a "serial" or similar number assigned by the manufacturer or OEM).

In at least some instances, at least a portion of the digital data retained in the nontransitory storage media may communicate authentication information used by the on-board control system 130 or by a remote back end or back office system to determine or select one or more favorable or unfavorable authentication states responsive to the determination that one or more components coupled to a vehicular system is either suitable or unsuitable for use with the vehicle 100 and/or with other vehicular system components or systems. For example, the authentication information provided by a vehicular component or system may be useful for determining whether a particular component or system has been supplied by the manufacturer or an authorized original equipment manufacturer ("OEM") supplier.

In another example, the authentication information provided by a vehicular component or system may be useful for determining whether the particular component or system has been formally transferred from a different vehicle. Such may provide a degree of component or theft protection since a component or system that has not been formally transferred may provide an indication to the control system 130 that the particular component or system is unsuitable for use with the vehicle 100. Components and systems may be formally transferred by reporting the transfer to a party such as the vehicle manufacturer or OEM supplier who may maintain a list of authorized transfer components or systems.

In one illustrative example, the nontransitory storage media coupled to an ignition switch may contain digital data representative of a character string such as a manufacturer or OEM part number or universal product code ("UPC") identifying the particular type of ignition switch. Based on the authentication information communicated from the nontransitory storage media coupled to the ignition switch to a control system 130 on-board the vehicle 100, the control system 130 can determine whether the ignition switch is suitable for use with a high capacity, high discharge rate, battery recently installed in the electric vehicle 100 using one or more defined criteria such as digital data representative of a compatibility or interoperability table stored in a machine readable nontransitory storage 132.

Other digital data may also be optionally stored in the nontransitory storage media that is physically coupled to each of the components in the vehicular system. Such digital data may include one or more performance criteria associated with the particular component or system (e.g., an nontransitory storage media physically coupled to an electric scooter drive motor may include non-volatile digital data indicative of the maximum permissible current flow to the windings in the motor). Such data may include volatile digital data that can be rewritten by the on-board control system 130 or by a remote back end or back office system (e.g., a nontransitory storage media physically coupled to an electric scooter drive motor may include volatile digital data indicative of the maximum historical current flow to the windings in the motor as monitored by the control system 130 or the back end or back office system). Other such non-volatile data may include chronological data indicative of the time and date at which the vehicular component or system was placed into service, vendor data indicative of the source of the vehicular component or system, temporal expiration data indicative of the last possible date of use of the vehicular component or system, useful life data indicative of the useful life (e.g., maximum number of kilometers driven, etc.) of the respective vehicular component or system.

In the subsequent discussion of various vehicular systems, it is important to note that the listed components are intended to convey a general sense and not an in-depth inventory of the various items or vehicular components that may be found in some, but not necessarily all, vehicle systems. Those of ordinary skill in the art will readily appreciate other non-enumerated components may or will be present in each of the systems and should be considered as falling within the scope of each system.

In at least some implementations, the cooling system 102 can include systems, devices or combinations of systems and devices for thermally cooling one or more vehicular systems. Such may include extended surface thermal transfer devices, fans, radiators, inverter and battery cooling fans, water pumps, eductors, ejectors, or any similar devices useful for moving a thermal cooling fluid such as water, air, glycol, or the like through, across or about a thermal transfer surface. The cooling system 102 may or may not be present in whole or in part on electric powered vehicles such as an electric powered scooter.

In at least some implementations, the fuel system 104 can include devices, systems, or combinations of systems and devices useful for storing and delivering in a controlled manner fuel to a vehicular powertrain. Such may include, but is not limited to, components such as fuel tanks, fuel pumps, fuel filters, fuel injectors, carburetors, and the like used in conjunction with fuel delivery to internal combustion engine technology. Such may also include devices, systems, and combinations of systems and devices used in conjunction with internal combustion engine technology as used in hybrid (e.g., gasoline/electric, diesel/electric, biofuel/electric, and kerosene/electric) powered vehicles. The fuel system 104 may or may not be present in whole or in part on electric powered vehicles such as electric scooters.

The steering system 106 includes any system, device, or combination of systems and devices useful for directional control of the vehicle. Such may include, but is not limited to, fork legs, fork slides, handlebars, steering shafts, power steering pumps, rack and pinion, steering wheels, and the like.

The suspension 108 includes any system, device, or combination of systems and devices useful for ensuring the drive mechanism of the vehicle remains in contact with the surface across which the vehicle is driven. Such may include, but is not limited to, physical suspension components such as trailing arms, leaf springs, shock absorbers, springs, upper and lower A-arms, tie rods, damper rods, damper bodies, mounting bushings; and vehicular frame or chassis components such as sub-frames, vehicular chassis components, tires, rims and the like.

The electrical/ignition system 110 includes any system, device, or combination of systems and devices capable of consuming, directing the flow of, or creating electricity on the vehicle. Such may include, but is not limited to ignition components such as power on and power off switches, ignition switches and ignition keys, batteries, generators, alternators, starters, lights, turns signals and similar indicators, electrical charging systems, electrical connectors, power cells, power converters, power supplies, electronic emissions control equipment, electronic engine or motor management systems, instrumentation, entertainment systems, navigation systems, on-board sensors, inverters, DC converters, rectifiers, battery electronic control modules ("ECM"), motor ECM, and the like. For example, an electric scooter may be equipped with at least a battery ECM and a motor ECM, along with instrumentation and control equipment to monitor and control the delivery of power from the power storage device to the electric motor.

The drivetrain/power transmission system 112 can include systems, devices, and combinations of systems and devices useful in transmitting all or a portion of the energy supplied by the powertrain or motor system to the suspension components used for driving the vehicle across a surface. Such may include, but is not limited to, manual or automatic transmissions, constantly variable transmissions, torque converters, drive shafts, half-shafts, chains and sprockets, belts and pulleys, clutches, pressure plates, center plates, throw out bearings, flywheels, shift linkages, and the like. For example, an electric scooter may have a driveshaft, gear and sprocket, or belt and pulley system to transmit the power provided by the motor to the rear wheel of the scooter.

The powertrain and motor system 114 can include systems, devices, and combinations of systems and devices useful in generating power with which the vehicle can be driven across a surface. Such may include, but is not limited to internal combustion engines and the various parts, subsystems, and assemblies required to operate the internal combustion engine, electric motors and the various windings, brushes, contactors, subsystems and assemblies required to operate the electric motor, hybrid power trains including the internal combustion engine and generator used to power the hybrid vehicle, and similar. For example, an electric scooter may have an electric motor that is powered using an on-board power storage device such as a battery.

The exhaust/emissions/safety systems 116 can include any systems, devices, or combination of systems and devices useful for controlling the environmental impact or footprint of the vehicle as well as ensuring the safety of the vehicle operator and those around the vehicle. Such exhaust or emissions systems may include, but are not limited to, catalytic converters, mufflers, emissions control modules, urea and other nitrogen based scrubbing systems, and the like. Such safety systems may include, but are not limited to, seat belts, various guards and protective devices to prevent accidental contact with moving or hot surfaces, seating areas, and the like.

The braking systems 118 can include any systems, devices, or combinations of systems and devices useful for controlling the speed of the vehicle across a surface. Such may include, but is not limited to, dynamic braking systems, regenerative braking systems, calipers, shoes, drums, brake pads, brake linings, master cylinder, brake hoses, brake locking plates, brake pedals, brake levers, and the like.

The above system descriptions are illustrative, not exhaustive, and are included to provide an example of the wide variety of vehicular components and vehicular systems to which a nontransitory storage media may be physically coupled by the vehicle manufacturer or OEM supplier. A nontransitory storage media need not be attached to every component included in a vehicular system. In at least some instances, the vehicular components and systems to which a nontransitory storage media is physically coupled may be selected or determined by the vehicle manufacturer or OEM supplier based at least in part on any number or combination of criteria, including: cost of the component or system; the effect of the component or system on user safety; the effect of the component or system on vehicle performance; the effect of the component or system on vehicle reliability; the effect of the component or system on vehicle compliance with local, state or federal regulations; or the like. In at least some implementations, differing degrees or levels of criticality may be assigned by the vehicle manufacturer or OEM supplier to the various components or systems carried by the vehicle. Such degrees of criticality may be assigned to each vehicular component or system based upon user safety, performance, legal compliance, or combinations thereof.

At least a portion of the nontransitory storage media may be communicably coupled to the on-board control system 130. In at least some instances, all or a portion of the nontransitory storage media physically coupled to the components forming one or more vehicular systems 102-118 may be wirelessly communicably coupled to the on-board control system 130, for example via one or more wireless radio frequency links. In such instances, the communicable coupling between the nontransitory storage media and the on-board control system 130 may be one time (e.g., at vehicle start-up), intermittent (e.g., at defined intervals while the vehicle is in operation), or continuous (e.g., at all times while the vehicle is in operation). In at least some implementations, at least a portion of the nontransitory storage media on some or all of the components coupled to the vehicle may include, at least in part, a non-volatile, rewriteable, memory. In such instances, the on-board control system 130 may write digital data to the non-volatile, rewriteable, portion of the nontransitory storage media at defined intervals or upon occurrence of one or more defined events.

In at least some instances, some or all of the nontransitory storage media physically coupled to the vehicular components may include active (e.g., powered) or passive (e.g., unpowered) radio frequency identification ("RFID") tags containing at least a tank circuit capable of converting incoming radio frequency energy to a current used to read the nontransitory storage media. In other instances, some or all of the nontransitory storage media physically coupled to the vehicular components may use one or more radio frequency communications protocols, including but not limited to: near field communications ("NFC"); Bluetooth®; Zigbee®; or the like. In such instances, the on-board control system 130 functions as an interrogator or system communications hub within the wireless communication network linking the nontransitory storage media physically coupled to the vehicular components. In at least some implementations, the on-board control system 130 may intermittently or continuously communicably couple some or all of the nontransitory storage media physically coupled to vehicular components or systems to a back end or back office system disposed remote from the vehicle 100. Such communicable coupling to a remote back end or back office system may be accomplished using any known or future wired or wireless data communication technology known to those of ordinary skill in the data communications arts.

In other instances, all or a portion of the nontransitory storage media physically coupled to the components forming one or more vehicular systems 102-118 may be communicably coupled to the on-board control system 130 via one or more conductors or buses, for example using one or more serial or parallel, unidirectional or bidirectional, data buses 120. In such instances, the communicable coupling between the nontransitory storage media and the on-board control system 130 may be one time (e.g., at vehicle start-up), intermittent (e.g., at defined intervals while the vehicle is in operation), or continuous (e.g., at all times while the vehicle is in operation). In at least some implementations, at least a portion of the nontransitory storage media on some or all of the components coupled to the vehicle may include, at least in part, a non-volatile, rewriteable, memory. In such instances, the on-board control system 130 may write digital data via the wired connection, to the non-volatile, rewriteable, portion of the nontransitory storage media at defined intervals or upon occurrence of one or more defined events.

The nontransitory storage media physically coupled to the vehicular components may bonded or otherwise irreversibly affixed in a manner that inhibits or prevents the removal of the nontransitory storage media from the vehicular component. In at least some instances, the nontransitory storage media may be embedded or encapsulated within the vehicular component. For example, an RFID device containing the nontransitory storage media may be encapsulated within an injection molded or extruded thermoplastic component (e.g., a plastic cover used to shield moving parts on the drivetrain of an electric scooter). In other instances, the nontransitory storage media may be bonded or affixed to an inaccessible location, such as an interior surface, of the vehicular component to impede or otherwise prevent tampering or removal of the nontransitory storage media from the vehicular component. For example, an RFID device containing the nontransitory storage media may be permanently affixed to an interior surface of an electronic housing (e.g., an interior surface of an emissions control module housing or an interior surface of a lamp base).

In at least some instances, a vehicle manufacturer or OEM supplier may designate a portion of the components used in a vehicle as "critical" components. Such critical components may include, but are not limited to components responsible for providing a safe user environment when operating the vehicle, components that create a safety risk should they not operate properly with other system components or vehicle systems, or components responsible for ensuring the compliance of the vehicle with local, state, or federal requirements which may include aspects of user and pedestrian safety, environmental performance, and minimum equipment requirements. In at least some instances, digital data stored or otherwise retained in the nontransitory storage media physically coupled to vehicular components designated as "critical components" may be used to provide an indication to the on-board control system 130 indicative of the critical nature of the respective component. In other instances, digital data indicative of the critical components on a vehicle may be provided from one or more external sources. For example digital data indicative of the critical components may be transferred from the vehicle manufacturer or OEM supplier to the on-board control system 130 via a communicable coupling between the on-board control system 130 and a remote electronic device such as a vehicle support kiosk, a remote back office or back end computer system, or via a mobile device download across a cellular or local area network.

The on-board control system 130 may be communicably coupled to a machine readable nontransitory storage 132. The machine readable nontransitory storage 132 may contain one or more data stores or data structures used by the on-board control system 130 to store or otherwise retain digital data communicated by the nontransitory storage media physically coupled to one or more vehicular components. The machine readable nontransitory storage 132 may also contain or otherwise retain one or more machine executable instruction sets executable by the on-board control system 130. The machine readable nontransitory storage 132 may include one or more discrete, non-volatile, storage devices that may include any current or future developed digital data storage device known to those of ordinary skill in the art. In some instances, removable non-transitory storage media may comprise at least a portion of the machine readable nontransitory storage 132. In yet other instances, some or all of the machine readable nontransitory storage 132 may include nontransitory storage located at least partially within the on-board control system 130.

In at least some instances, digital data in the form of one or more data stores or data sets may be stored, contained, or otherwise retained in the machine readable nontransitory storage 132. Such data stores or data sets may include digital data indicative of available manufacturer or OEM authorized replacement, customization, or upgrade vehicular components or systems having some degree of compatibility with currently installed vehicular components or systems. Such compatibility data may be referenced or otherwise indexed by the digital data contained or otherwise retained or stored in the nontransitory storage media physically coupled to the vehicular components or systems.

In at least some instances, one or more data stores may contain data indicative of critical vehicular components determined "critical" to the operation of the vehicle 100 by the vehicle manufacturer or OEM supplier. Such "critical" components may include but are not limited to components required for the safe operation of the vehicle 100, components that create a safety risk should they not operate properly with other system components or vehicle systems, or components required to ensure compliance with one or more local, state or federal requirements. In operation, the on-board control system 130 can cross reference a vehicular component inventory communicated by the nontransitory storage media physically coupled to the vehicular components to the digital data contained in the data store in the machine readable nontransitory storage 132 to confirm or otherwise determine whether necessary critical vehicular components are present on the vehicle 100.

In at least some implementations, the vehicle manufacturer or OEM supplier may load, write, or otherwise store digital data corresponding to an inventory of the nontransitory storage media physically coupled to the vehicular components used to build the vehicle 100 into a data store in the machine readable nontransitory storage 132. In at least some instances, the on-board control system 130 may use such a stored vehicular component inventory to authenticate one or more replacement vehicular components for compatibility with the vehicular system or the vehicle 100. For example, the on-board control system 130 may authenticate a replacement or exchange power source or battery installed in an electric vehicle such as an electric scooter. In another example, the on-board control system 130 may authenticate an ignition key placed in the ignition switch of the vehicle prior to starting the vehicle.

In some instances, the on-board control system 130 or a communicably coupled remote back office or back end system may use authentication information collected from some or all of the nontransitory storage media physically coupled to the vehicular components or systems to create a single character string used for one time, periodic or intermittent authentication. The use of a single character string developed using authentication information collected from some or all of the nontransitory storage media physically coupled to the vehicular components or systems may advantageously provide a degree of vehicular security since illegally obtained or unauthorized vehicular components or systems will alter the character string thereby placing the vehicle in an unfavorable authentication state.

In at least some situations, the on-board control system 130 may provide full or partial operability of one or more vehicular systems responsive to the successful completion of at least a portion of the authentication process and subsequent placement of the vehicle or one or more vehicular systems in a favorable authentication state. For example, the on-board control system 130 may permit the full operation of an electric vehicle 100 only when a battery or storage device having adequate capacity and discharge characteristics compatible with the powertrain system 114 components is coupled to the electric vehicle 100. In another example, the on-board control system 130 may determine the digital data provided by a nontransitory storage media in a battery is indicative of a battery that is partially discharged or that has a high cycle count resulting in reduced energy storage capacity. Consequently, the on-board control system 130 may impair the performance or operation of one or more vehicular systems (e.g., limiting speed to less than 30 kilometers/hour) in response to the reduced quantity of power available from the battery or power source.

FIG. 2A shows a system 200 that includes an electric vehicle electrical/ignition system 110, a powertrain system 114 and a controller 130, according to one illustrated embodiment. The electrical/ignition system 114 includes an ignition key 202 that is capable of being operably coupled to an ignition switch 204 and a battery 206 that is electrically coupled to the ignition switch 204. In the system 200, the ignition switch 204 controls the flow of power from the battery 206 to the electric motor 208 in the powertrain system 114. Other components such as a throttle device to control the power delivery rate from the battery 206 to the motor 208 are present in the electrical/ignition system 110, but are not shown for clarity and ease of description.

A nontransitory storage media 202a is physically coupled to the ignition key 202, a nontransitory storage media 204a is physically coupled to the ignition switch 204, a nontransitory storage media 206a is physically coupled to the battery 206, and a nontransitory storage media 208a is physically coupled to the motor 208. Some or all of the nontransitory storage media physically coupled to each of the vehicular components are communicably coupled to the on-board control system 130 via one or more wired or wireless communication links 120. Each of the nontransitory storage media can communicate digital data indicative of the authentication information (e.g., part number, model number, etc.) logically associated with the vehicular component or system to which the nontransitory storage media is physically coupled. In at least some instances, the nontransitory storage media may also optionally communicate digital data indicative of a unique identifier (e.g., serial number, etc.) logically associated with the vehicular component or system to which the nontransitory storage media is physically coupled.

In at least some instances, the on-board control system 130 may write or otherwise store authentication information logically associated with some or all of the components present in the electrical/ignition system 110 and the powertrain system 114 in the communicably coupled machine readable nontransitory storage 132. In such instances, the on-board control system 130 may execute a hard-coded instruction set or may execute one or more sets of machine executable instructions read from the machine readable nontransitory storage 132. In at least some instances, the instruction set executed by the on-board control system 130 may prevent or limit power flow from the battery 206 through the ignition switch 204 to the motor 208 unless the authentication information stored in the nontransitory storage media physically coupled to the ignition key 202 at least partially corresponds to one or more defined criteria. In at least some instances, the one or more defined criteria may be established in whole or in part using authentication information stored or otherwise retained in the machine readable nontransitory storage 132.

The on-board control system 130 may periodically or intermittently update the authentication information and other digital data stored in the machine readable nontransitory storage 132 to reflect the current vehicle component and system inventory. Such authentication information may be updated, for example, to reflect the connection of a new or replacement power storage device such as a battery 206 in an electric vehicle. In at least some implementations, the machine readable nontransitory storage 132 may include a compatibility data store that includes digital data indicative of the interoperability or compatibility of manufacturer and OEM authorized or sanctioned replacement, customization, and upgrade components and systems. Such a compatibility data store may, for example, include digital data indicative of the compatibility of the currently installed ignition switch 204 with a replacement 7.5 HP motor or a replacement 10 HP motor provided by the manufacture or OEM supplier. Such a compatibility data store may, for example, also include digital data indicative of the incompatibility of the currently installed ignition switch 204 with a replacement 15 HP motor provided by the manufacture or OEM supplier.

In another example, electronic data storage devices may be disposed in, on, or about a vehicular electronic control unit, a vehicular motor controller, an energy storage device such as a battery 206, and an ignition system component such as a key or keyfob 202. Upon inserting the key or placing the keyfob proximate the vehicle, the on-board control system 130 can obtain and compare the authentication information from the electronic data storage devices and compare the obtained information with stored authentication information to determine an authentication state associated with the vehicle. For example, the on-board control system obtains authentication information from the electronic storage devices and compares the authentication information from one electronic data storage device with authentication information from other data storage devices. If the obtained authentication information is authenticated against the stored authentication information, the vehicular systems may function normally. If the obtained authentication information does not authenticate against the stored authentication information, full or partial operation of one or more vehicular systems may be inhibited. In some instances, such system inhibition may result in partial operation of the vehicular system (e.g., electronic instruments may operate normally, however the motor controller may not deliver electric flow to the motor). In other instances, such system inhibition may result in complete deactivation of the vehicular system.

In some implementations, a two stage authentication process where a first authentication process is used to authenticate at least a portion of the vehicular components against each other, for example to verify the component source as either a vehicle manufacturer or approved OEM supplier, and a second authentication process is used to authenticate one or more vehicular components such as a key or keyfob against a stored authentication value to activate one or more vehicular systems, for example the ignition system of the vehicle.

To perform the first authentication process in at least some implementations, at least a portion of the components included in one or more vehicular systems may include a nontransitory storage media 102 containing data indicative of a first authentication string, for example a shared or common vehicle manufacturer specific or OEM supplier specific data string or "key." Using an electric scooter as an illustrative example, nontransitory storage media 102 containing the first authentication string may be disposed in, on, or about the power storage device (i.e., battery), the electronic control module or "ECM," and the electric motor controller. Upon initial power-up, the ECM can generate data indicative of an authentication code by algorithmically combining the vehicle manufacturer supplied key with an authentication seed such as a self-generated random number. The ECM can transmit the authentication seed to the battery and the motor controller. In response to the receipt of the authentication seed from the ECM, the battery and the motor controller will each algorithmically combine their respective stored first authentication code with the authentication seed supplied by the ECM. The battery and motor controller can then communicate the resultant authentication string to the ECM for comparison with the authentication code. Any change or variation in the data indicative of the first authentication string in the nontransitory storage media within either the battery or the motor controller will thus result in an unsuccessful authentication.

Continuing with the previous illustrative example, to perform the second authentication process a key or keyfob 202 may include a nontransitory storage medium 102 containing data indicative of a second authentication string such as a subscriber or scooter specific data string, identifier, or "ID." In at least some implementations, the second authentication string may also be stored in the nontransitory storage medium 102 included in the scooter ECM as a second authentication code. After successfully completing the first authentication process, the authenticated scooter ECM can communicate with the nontransitory storage medium 102 in the key or keyfob 202 to authenticate the data indicative of the second authentication string that is stored in the nontransitory storage medium 102 in the key or keyfob 202 against the second authentication code stored in the nontransitory storage medium 102 in the ECM.

In at least some implementations, the data indicative of the second authentication code may also be retained within a back office or back end system. Such centralized storage of data indicative of the second authentication code permits the accumulation of authentication data from each of the vehicular components, including replaceable vehicular components such as batteries, in a centralized nontransitory storage medium located in a back end or back office system that is secure and maintained in a controlled environment. Such may enable the tracking or verification of vehicle manufacturer specific or OEM supplier specific data strings or keys associated with a particular subscriber ID. Such also allows the "programming" of replaceable or exchangeable components such as replacement batteries with the appropriate manufacturer data string or key based on the subscriber specific ID provided by the keyfob or scooter ECM at the point of exchange.

The use of such a compatibility data store may beneficially limit a user's ability to perform modifications or upgrades to a vehicle 100 using components or systems that the vehicle manufacturer or OEM supplier has found to compromise the expected performance or service life of the vehicle 100. The use of such a compatibility data store may also advantageously limit the use of replacement components to those having a nontransitory storage media containing manufacturer or OEM approved authentication information or other digital data capable of authorizing or otherwise indicating the suitability of the replacement components not just with vehicle 100, but also with some or all of the other vehicular components and systems.

FIG. 2B shows a system 220 that includes an internal combustion engine vehicle electrical/ignition system 110, powertrain system 114 and controller 130, according to one illustrated embodiment. In addition to the ignition key 202, ignition switch 204, and battery 206 the electrical/ignition system 110 includes a coil 224, a distributor 226, and one or more spark plugs 228. In the system 220, the ignition switch 204 controls the flow of power to the coil 224, distributor 226, spark plug(s) 228 and, ultimately, the engine 230 in the powertrain system 114.

A nontransitory storage media 224a is physically coupled to the coil 224, a nontransitory storage media 226a is physically coupled to the distributor 226, and a nontransitory storage media 230a is physically coupled to the engine 230. In at least some instances, routinely available replaceable parts such as spark plug(s) 228, belts, hoses, and the like may or may not include a nontransitory storage media as shown in FIG. 2B. Some or all of the nontransitory storage media physically coupled to each of the vehicular components may be continuously or intermittently communicably coupled to the on-board control system 130 via one or more wired or wireless communication links 120. Each of the nontransitory storage media can communicate digital data indicative of the authentication information (e.g., part number, model number, etc.) logically associated with the vehicular component or system to which the nontransitory storage media is physically coupled. In at least some instances, the nontransitory storage media may also optionally communicate digital data indicative of a unique identifier (e.g., serial number, etc.) logically associated with the vehicular component or system to which the nontransitory storage media is physically coupled.

Figure 3:
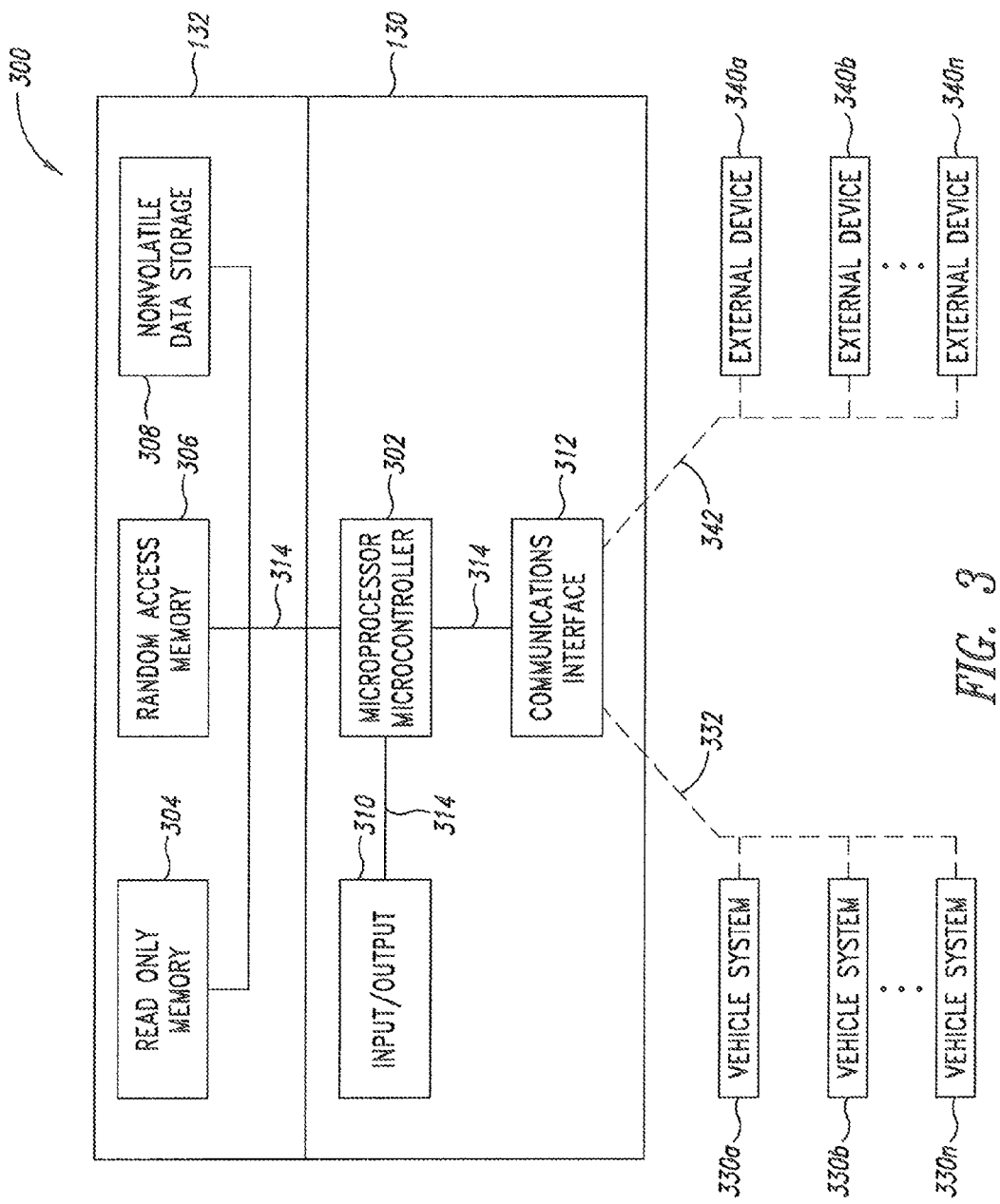
FIG. 3 is a block diagram showing an illustrative onboard controller including a microprocessor, a nontransitory storage media, an input/output interface, and a communications interface to communicably couple to any number of vehicular systems, and any number of external devices, according to one non-limiting illustrated embodiment.

FIG. 3 shows an illustrative on-board control system 130 that may be wiredly or wirelessly communicably coupled 332 to any number of vehicular systems 330a-330n (collectively "vehicular systems 330") and may also be wiredly or wirelessly communicably coupled 342 to any number of external devices 340a-340n (collectively "external devices 340"), according to one or more non-limiting embodiments. In at least some implementations, the number of vehicular systems 330 may include the vehicular systems 102-118 discussed in detail above with regard to FIG. 1. The on-board control system 130 can include a controller 302, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 302 may take the form of a microprocessor (e.g., INTEL, AMD, ATOM). In at least some instances, the control system 130 may be collocated or disposed in a battery ECM or motor ECM of an electric vehicle. In other instances, the on-board control system 130 may be collocated or disposed in a location permanently attached or affixed to a vehicle chassis or other structural member physically coupled to the vehicle 100. In at least some instances, the on-board control system 130 may be hermetically sealed or otherwise protected against the environment and from external tampering.

At least one machine readable nontransitory storage 132, for example read only memory (ROM) 304, random access memory (RAM) 306, and nonvolatile data storage 308 (e.g., solid-state storage media such as flash memory or EEPROM, spinning storage media such as hard disk) may be communicably coupled to the control subsystem 130. In some instances, the machine readable nontransitory storage 132 can include one or more removable nontransitory storage devices (e.g., Secure Digital media ("SD"), Compact Flash ("CF") or universal serial bus ("USB") storage devices). The at least one machine readable nontransitory storage 132 may be in addition to any non-transitory storage medium (e.g., registers) physically located in the controller 302. The on-board control system 130 may include one or more internal communications links or buses 314 (only one illustrated) communicably coupling or linking various control system components, for example one or more power buses, instruction buses, data buses, etc.

As illustrated, the machine readable nontransitory storage 132 stores machine executable instructions and digital data indicative of one or more authentication criteria, authentication information, component or system compatibility data stores or data sets, and the like. Such digital data may be initially written or stored in the machine readable nontransitory storage 132 by the vehicle manufacturer or OEM supplier. Such digital data may be periodically or intermittently updated by the on-board control system 130, for example using digital data obtained from a remote back office or back end system containing digital data provided by the vehicle manufacturer or OEM supplier.

The machine readable nontransitory storage 132 may also contain or otherwise retain one or more data stores or data sets. In at least some implementations, such data stores or data sets may include an inventory or list of components or systems the vehicle manufacturer or OEM has found suitable for use with the specific vehicle with which the machine readable nontransitory storage 132 is logically associated. In at least some implementations, such data stores or data sets may include one or more compatibility matrices provided by the vehicle manufacturer or OEM that provides an inventory or list of components or systems the vehicle manufacturer or OEM has found suitable for use with the class of vehicle with which the machine readable nontransitory storage 132 is logically associated. In at least some instances, all or a portion of the data stores or data sets in the machine readable nontransitory storage 132 may be fixed (i.e., non-rewriteable) by the vehicle manufacturer or OEM. In other instances, all or a portion of the data stores or data sets in the machine readable nontransitory storage 132 may be at least partially rewriteable using, for example, updated compatibility data provided by the vehicle manufacturer or OEM.

The data store or data sets in the machine readable nontransitory storage 132 may take a variety of forms, for example a lookup table, a set of records in a database, etc. The machine executable instruction sets are executable by the controller 302 and the data stores or data sets are readable by the controller 302. Execution of the machine executable instruction sets by the controller 302 and accessing the digital data included in the sets of data or values can cause the controller 302 to perform specific acts to cause the collection of digital data representative of authentication information from nontransitory storage media physically coupled to the vehicle components and systems. The controller 302 can then compare some or all of the collected authentication information with one or more criteria to determine whether to place one or more vehicular components or systems in a favorable authentication state or an unfavorable authentication state. Responsive to placing one or more vehicular components or systems in a favorable authentication state, the controller 302 can permit partial or full operation of some or all vehicular systems (e.g., responsive to determining that a component in an electric scooter is authorized, full operation of all scooter systems may be provided by the controller 302). On the other hand, responsive to placing one or more vehicular components or systems in an unfavorable authentication state, the controller 302 can partially or completely inhibit or provide limited or no functionality to some or all vehicular components or systems (e.g., responsive to determining that a safety critical component in an electric scooter is not authorized for use with the specific scooter, the speed of the scooter may be limited to 20 km/hr or less). Specific operation of the control system 130 responsive to various favorable and unfavorable authentication states is described in detail in FIGS. 6-9 below.

A user input/output ("I/O") device 310 may be communicably coupled 314 to the controller 302. The I/O device 310 may be used to provide a user with human perceptible information such as a visual data display on a visual output device such as a liquid crystal display ("LCD") screen, an audible display on an auditory output device such as a speaker or headphone, or some combination thereof. In some instances, the I/O device may also accept input from a user. Such input may be tactile, for example via a touchscreen or similar. Such input may be audible, for example via voice commands delivered by the user via a microphone. In at least some instances, the I/O device 310 can be used by the controller 302 to provide the user with information regarding the vehicular components or systems. For example, in at least some instances, the controller 302 may provide the user with an indication, via a sound, voice, or display delivered by the I/O device 310, that all of the vehicular components or systems have been successfully authenticated and full operability is provided. In other instances, the controller 302 may provide the user with an indication, via a sound, voice, or display delivered by the I/O device 310, that some of the vehicular components or systems were not successfully authenticated or were found unsuitable for use with the vehicle and consequently the controller 302 has compromised the performance of one or more vehicular systems.

The on-board control system 130 receives signals from the one or more vehicular components in all or a portion of the vehicular systems 330 forming the vehicle 100 and from one or more external device 340a . . . 340n (collectively "external devices 340") via the communications interface 312. In at least some instances, the nontransitory storage media physically coupled to the vehicular components or systems 330 and the external devices 340 may communicate with the controller 302 using a similar or dissimilar communications protocol. Thus, the communications interface 312 may include any number of interfaces having similar or different communications protocols and data transfer rates. In at least some instances, communication between the controller 302 and some or all external devices 340 may be autonomously initiated based on time, proximity, the occurrence of a defined event, or any combination thereof.

In at least some instances, the external devices 340 may include portable electronic devices such as a smartphone or personal digital assistant carried by the user of the vehicle 100. In such instances, the user may execute machine executable instructions, for example in the form of an application or "app," on the portable electronic device to initiate unidirectional or bidirectional communication with the controller 302. Such communication between the controller 302 and the portable electronic device 340 may facilitate the delivery of vehicular data to the user. In at least some instances, at least a portion of the data displayed on the portable electronic device 340 may be sourced from a remote network device such as a server computer system having content selected or sourced by the vehicle manufacturer or OEM supplier. Such communication between the portable electronic device 340 and the controller 302 may facilitate the delivery of updated component or system information from the user, vehicle manufacturer, or OEM supplier to the controller 302. In at least some instances, the portable electronic device 340 may provide the vehicle user, either autonomously or on demand, with targeted offers and advertisements based upon vehicular component data, vehicular system data, user data, pattern or use data, and the like obtained from the controller 302 in the electric vehicle 100 operated by the user. In at least some instances, such targeted offers and advertisements delivered by the portable electronic device may be provided in whole or in part by, through, at the direction of, or with the authorization or sanction of the vehicle manufacturer or OEM supplier. In at least some instances, such targeted offers and advertisements may provide the user with a list containing one or more replacement, customization, or upgrade components or systems that are compatible with the user's vehicle. In at least some instances, such targeted offers and advertisements may be based in whole or in part on digital data indicative of the user's driving preferences obtained from the machine readable nontransitory storage 132 or digital data indicative of the vehicle's operating history obtained from the machine readable nontransitory storage 132. In at least some instances, such targeted offers and advertisements may additionally include information indicative of locations or directions to locations where the user may purchase or otherwise acquire vehicle manufacturer or OEM supplier authorized or sanctioned replacement, optional, or customization parts or accessories.

In at least some instances, the external devices 340 may include a remote system operated by or under the authorization or sanction of the vehicle manufacturer or OEM supplier. For example, a remote processor disposed in a battery vending kiosk used to exchange batteries for electric vehicles, such as electric scooters. In such instances, the remote processor may wiredly or wirelessly exchange information with the controller 302 onboard the vehicle 100. Such an information exchange makes possible updates to the controller 302 and to data sets or data stores in the machine readable nontransitory storage 132. Such an information exchange further makes possible the acquisition of information relevant to the selection and supply of an exchange battery compatible with the vehicle 100. In at least some instances, the remote processor in the external device 340 may be communicably coupled to an output device such as a display or speaker that is capable of providing human perceptible feedback to the vehicle user when the user interacts with the external device. For example, an electric vehicle battery exchange kiosk may be equipped with an LCD display and speaker capable of providing an electric vehicle user with targeted offers and advertisements based upon vehicular component data, vehicular system data, user data, pattern or use data, and the like autonomously obtained by the remote processor from the controller 302 in the electric vehicle 100 operated by the user. In another example, a parts or service center may contain a full or self-service service kiosk, a full or self-service customization kiosk, or a full or self-service upgrade kiosk equipped with an LCD display and speaker capable of providing an electric vehicle user with targeted offers and advertisements based upon vehicular component data, vehicular system data, user data, pattern or use data, and the like obtained from the controller 302 in the electric vehicle 100 operated by the user. In at least some instances, such targeted offers and advertisements delivered by the kiosk may be provided in whole or in part by, through, at the direction of, or with the approval of the vehicle manufacturer or OEM supplier.

Figure 4:
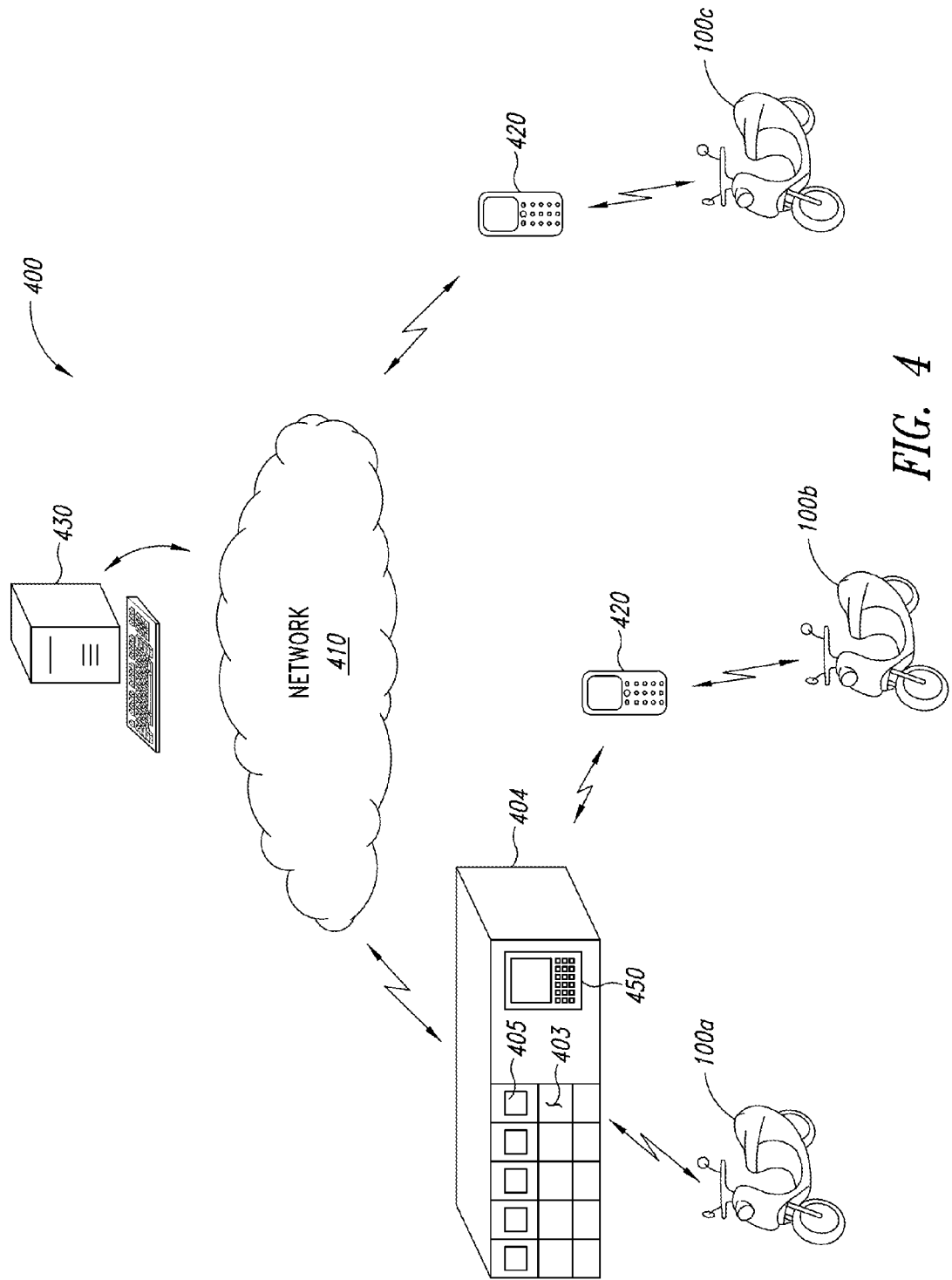
FIG. 4 is a schematic view of the an onboard vehicle controller communicating with a remote network device via a local connection to an illustrative battery exchange kiosk or an illustrative mobile electronic device such as a smartphone, according to one non-limiting illustrated embodiment.

FIG. 4 shows a system 400 in which a vehicular control system communicates via a network 410 with a remote back end or back office system 430 via a local connection to an illustrative battery exchange kiosk 404 or an illustrative mobile electronic device 420 such as a smartphone, according to one non-limiting illustrated embodiment. The vehicular components or systems 330 on the vehicle 100 provide the on-board control system 130 with authentication information and digital data obtained from the nontransitory storage media physically coupled to the vehicular components or systems. The authentication information and digital data so obtained by the control system 130 may be stored in whole or in part in the machine readable nontransitory storage 132. Such digital data may be used by the on-board control system 130 to authenticate or determine the suitability of some or all of the vehicular components or systems prior to or during operation of the vehicle 100. Responsive to the placement of some or all vehicle components or systems in a favorable authentication state and/or responsive to the determination that of some or all of the vehicular components or systems are suitable for use with the vehicle 100, the control system 130 may provide partial or full operability to some or all vehicular components or systems. Responsive to the placement of some or all vehicle components or systems in an unfavorable authentication state and/or responsive to the determination that some or all of the vehicular components or systems are partially or completely unsuitable for use with the vehicle 100, the control system 130 may partially or completely inhibit the functionality of, or provide limited or no operability to some or all vehicular components or systems.

A vehicle manufacturer or OEM supplier may release replacement, customization, or upgrade parts, components or systems after manufacture of a vehicle 100. The design and operation of such replacement, customization, or upgrade parts, components or systems may be backward compatible with the respective vehicle 100. In the absence of a method for updating the authentication information, authentication criteria, and/or digital data contained or otherwise retained in the data stores or data sets in the machine readable nontransitory storage 132, such replacement, customization, or upgrade parts, components or systems may create an undesirable situation where the on-board control system 130 is unable to authenticate the replacement, customization, or upgrade parts, components or systems. The ability for the vehicle manufacturer or OEM supplier to sanction or control the transfer of updated digital data from a remote back end or back office system 430 to the control system 130 in a vehicle 100 via a mobile electronic device 420 or via a kiosk such as the battery exchange kiosk 404 advantageously permits intermittently, periodically, or regularly updating the authentication information, authentication criteria, and/or data stores or data sets in the machine readable nontransitory storage 132 to reflect newly available replacement, customization, or upgrade parts, components, or systems compatible with the vehicle 100.

The collection and distribution kiosk 404 has a plurality of receivers, compartments or receptacles 403 to removably receive portable electrical energy storage devices (e.g., batteries, supercapacitors or ultracapacitors) 405 for collection, charging and/or distribution. As illustrated in FIG. 4, some of the receivers 403 are empty, while others hold portable electrical energy storage devices 405. While FIG. 4 shows a single portable electrical energy storage device 405 per receiver 403, in some embodiments each receiver 403 may hold two or even more portable electrical energy storage devices 405. For example, each of the receivers 403 may be sufficiently deep to receive three portable electrical energy storage devices 405. Thus, for example, the collection and distribution kiosk 404 illustrated in FIG. 4 may have a capacity capable of simultaneously holding 40, 80 or 120 portable electrical energy storage devices 405.

The portable electrical energy storage devices 405 may take a variety of forms, for example batteries (e.g., array of battery cells) or supercapacitors or ultracapacitors (e.g., array of ultracapacitor cells). For example, the portable electrical energy storage devices 405 may take the form of rechargeable batteries (i.e., secondary cells or batteries). The portable electrical energy storage devices 405 may, for instance, be sized to physically fit, and electrically power, electric vehicles 100, such as all-electric scooters or motorbikes. As previously noted, combustion engine scooters and motorbikes are common in many large cities, for example in Asia, Europe and the Middle East. The ability to conveniently access charged batteries throughout a city or region may encourage the adoption of and facilitate the use of all-electric scooters and motorbikes 100 in place of combustion engine scooters and motorbikes, thereby alleviating air pollution, as well as reducing noise.

In at least some instances, the energy storage devices 405 delivered by the collection and distribution kiosk 404 to a vehicle user may include an electronic data storage device containing authentication information that is used for authentication by the on-board control system 130 of the vehicle in which the energy storage device is connected. In such instances, when a vehicle user exchanges or otherwise obtains an energy storage device 405 at the collection and distribution kiosk 404, the stored authentication information associated with the vehicle must be updated to reflect the energy storage device 405 authentication information, the energy storage device 405 authentication information must be updated to reflect the stored authentication information associated with the vehicle, or some combination thereof. In one implementation, the collection and distribution kiosk 404 may obtain the authentication information associated with an exchange power storage device 405 provided by the vehicle user, via a wired or wireless communicable coupling with the vehicle on-board control system 130, or via a wired or wireless communicable coupling with a remote back end or back office system used to store or otherwise retain vehicle authentication information. The collection and distribution kiosk 404 can then load the obtained authentication information into the electronic data storage device on the energy storage device 405 prior to delivering the energy storage device 405 to the vehicle user.

The collection and distribution kiosk 404 may be located in a convenient and easily accessible area accessible to the users of electric vehicles such as electric scooters. The location may take any of a large variety of forms, for example, a retail environment such as a convenience store, supermarket, gas or petrol station, or service shop. Alternatively, the collection and distribution kiosk 404 may stand alone at a location not associated with an existing retail or other business, for example in public parks, private and public parking facilities, or other public places.

Thus, for example, collection and distribution kiosks 404 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection and distribution kiosks 404 to be quickly developed in a city or region. Quickly achieving a large network which is geographically well distributed to serve a target population enhances the ability to depend on such a system and likely commercial success of such an effort. Providing a system in which users who use the collection and distribution machines (e.g., such as collection and distribution kiosk 404) can be presented, on their mobile device 420, with information regarding their vehicle 100, and also provided the ability to alter, adjust or change vehicle settings, authentication information, authentication criteria, or configuration data stored in the machine readable nontransitory storage 132 to reflect replacement, customization, and upgrade parts that the user may have physically or operably coupled to the vehicle 100. Such communicable coupling between the kiosk 404 and the vehicle 100 or a mobile electronic device 420 also permits the receipt of alerts regarding maintenance of the vehicle (e.g., routine maintenance items, part failures, recall notices, etc.) or information regarding the location of parts, accessories, customization parts, upgrades, and battery kiosks 404 can enhance the user's confidence and reliance on such an electric vehicle battery exchange system and likely increase the commercial viability of such an effort.

The location of the kiosk 404 may include an electrical service to receive electrical power from a generating station (not shown) for example via a grid. The electrical service may, for example, include one or more of an electrical service meter, a circuit panel (e.g., circuit breaker panel or fuse box), wiring, and electrical outlet. Where the location is an existing retail or convenience store, the electrical service may be an existing electrical service, so may be somewhat limited in rating (e.g., 120 volts, 240 volts, 220 volts, 230 volts, 15 amps).

The collection and distribution kiosk 404 may be communicatively coupled to one or more remotely located computer systems, such as the back end or back office system 430. The back end or back office system 430 may collect data from and/or control a plurality of collection and distribution kiosks 404 distributed about an area, such as a city. The communications may occur over one or more communications channels including one or more networks 410, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection and distribution kiosk 404 may include a user interface 450. The user interface 450 may include a variety of input/output (I/O) devices to allow a user to interact with the collection and distribution kiosk 404. The kiosk 404 can include various electrical and electronic components to charge portable electrical power storage devices 405 when positioned or received in the receivers 403. For example, the kiosk 404 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components.

The kiosk 404 may include one or more communications modules or components to facilitate communications with the various components of the back end or back office system 430. Such communications modules or components may, for example, include one or more modems or one or more Ethernet or other types of communications cards or components. The communications modules or components may provide wired and/or wireless communications between the kiosk 404 and the back end system 430; between the kiosk 404 and the vehicle 100; between the kiosk 404 and a mobile electronic device provided by the vehicle user; or some combination thereof. The communications modules or components may include one or more ports, wireless receivers, wireless transmitters or wireless transceivers to provide wireless signal paths to the various remote components or systems. The communications modules or components may include one or more bridges or routers suitable to handle network traffic including switched packet type communications protocols (TCP/IP), Ethernet or other networking protocols.

The user interface 450 includes one or more user input/output (I/O) components. For example, user interface 450 may include a touch screen display operable to present information and a graphical user interface (GUI) to a vehicle user and to receive indications of vehicle user selections or inputs. The user interface 450 may include a keyboard or keypad, and/or a cursor controller (e.g., mouse, trackball, trackpad) (not illustrated) to allow a vehicle user to enter information and/or select user selectable icons in a GUI. The user interface 450 may include a speaker to provide audible messages to a vehicle user or a microphone to receive spoken user input such as spoken commands. The user interface 450 may also include an image capture device such as a video camera or still camera.

The user interface 450 may further include a media reader to read information from media supplied by the vehicle user. Such a media reader may take a variety of forms. For instance, the media reader may take the form of, or include, a magnetic stripe reader for reading information encoded in a magnetic stripe on a card that is carried by or logically associated with the vehicle user. For instance, the media reader may take the form of, or include, a machine-readable symbol (e.g., barcode, matrix code, or similar optical code) reader for reading information encoded as a machine-readable symbol on a card that is carried by or logically associated with the vehicle user. For instance, the media reader may take the form of, or include, a smart card reader for reading information encoded in a non-transitory medium on a card that is carried by or logically associated with the vehicle user. Such may, for instance, include media employing radio frequency identification ("RFID") transponders or electronic payment chips (e.g., near filed communications ("NFC") chips). Thus, the media reader may be able to read information from a variety of media types, for instance credit cards, debit cards, gift cards, prepaid cards, as well as identification media such as drivers licenses.

The user interface 450 may additionally include a bill acceptor and a validator or coin acceptor to accept and validate cash payments. Such may be highly useful in servicing populations who lack access to credit. The bill acceptor and validator or the coin acceptor may take any variety of forms, for example those that are currently commercially available and used in various vending machines and kiosks.

Figure 5:
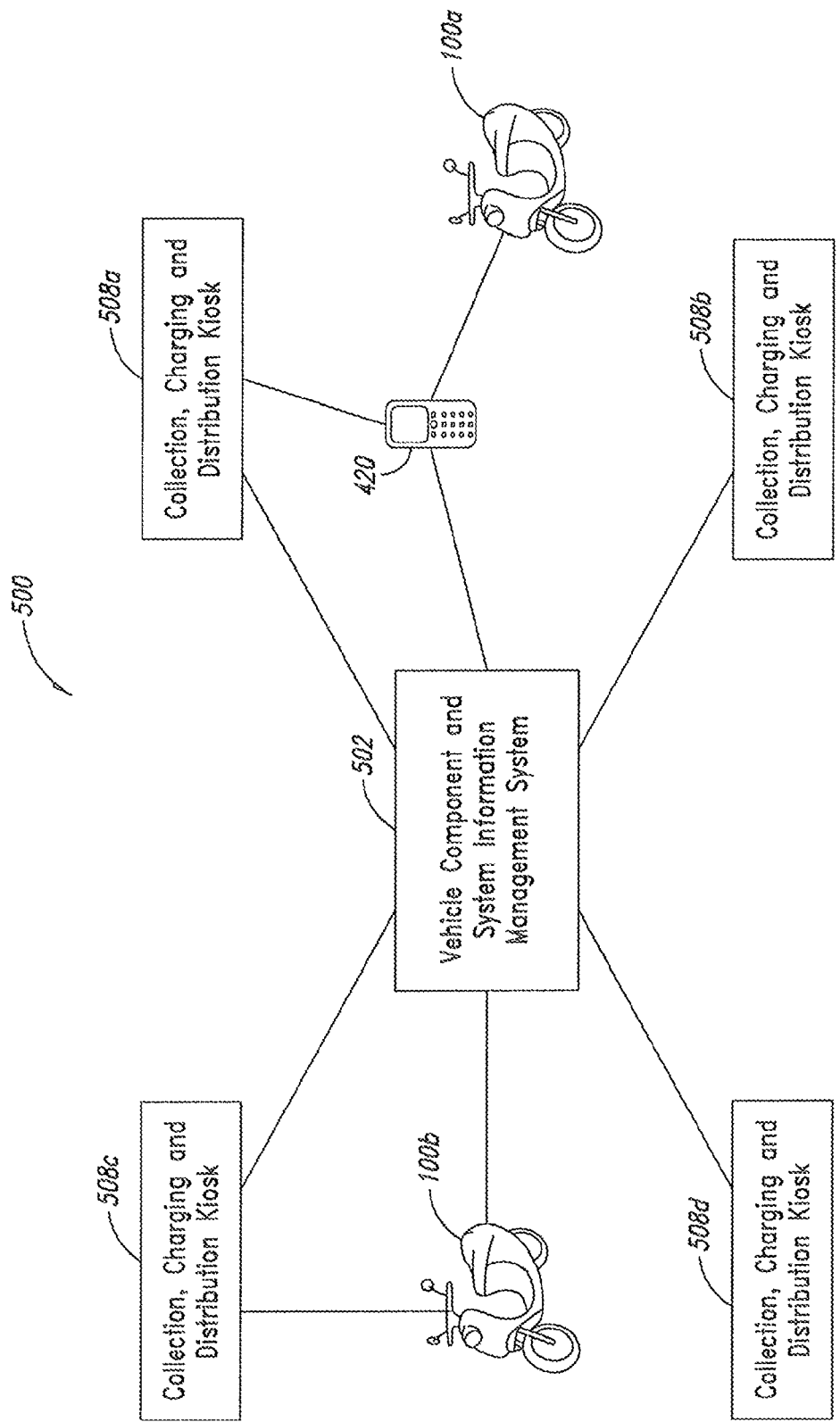
FIG. 5 is a schematic view of a vehicle component and system information management system coupled to a number of vehicles via a number of illustrative battery exchange kiosks, according to one non-limiting embodiment.

FIG. 5 is a block diagram of a system 500 for providing information regarding a vehicle via a mobile electronic device 420 which shows example collection and distribution kiosks 508*a*, 508*b*, 508*c* and 508*d*, within the system, according to one non-limiting illustrated embodiment.

Shown is a vehicle component and system information management system 502 for providing component and system information regarding a vehicle via a mobile electronic device, such as, for example, mobile device 420. For example, the vehicle component and system information management system 502 provides information regarding diagnostics or status of components or systems present in the vehicle 100*a*. The vehicle component and system information management system 502 may also provide information regarding the vehicle user and usage history of the vehicle 100*a*. This information may be received from one or any combination of the items shown in FIG. 5, including the example collection and distribution kiosks 508*a*, 508*b*, 508*c* and 508*d*, the mobile device 420, the vehicle (e.g., electric scooter 100*a* or 100*b*). This information may be wirelessly or wiredly received directly or indirectly from the machine readable nontransitory storage 132 in the on-board control system 130 of vehicle 100*a*. In at least some implementations, this information may be transmitted to the vehicle component and system information management system 502 by the controller 302 via the control system communications interface 308 of vehicle 100*a* to a mobile electronic device 420 and then to the kiosk 508*a*. In other implementations, this information may be transmitted directly to the vehicle component and system information management system 502 by the controller 302 via the control system communications interface 308 of vehicle 100*a*. In yet other implementations, this information may be transmitted to the vehicle component and system information management system 502 by the controller 302 via the control system communications interface 308 of vehicle 100*a* to the kiosk 508*a* and then to the vehicle component and system information management system 502.

In some embodiments, the vehicle component and system information management system 502 may be the back end or back office system 430 shown in FIG. 4. In other embodiments, the vehicle component and system information management system 502 may be part of or may in operable communication with, the back end or back office system 430 shown in FIG. 4.

The information regarding a vehicle provided by the system 500 via a user mobile electronic device 420 may include, or may be based on, at least some information regarding one or more of: status or condition of the vehicle, status or condition of one or more systems of the vehicle, customizable features of the vehicle, settings of customizable features of the vehicle, condition or status of an engine or motor of the vehicle, one or more electrical systems of the vehicle, health of the vehicle, oil level of the vehicle, security of the vehicle, locks of the vehicle, transmission system of the vehicle, maintenance of the vehicle, recommended maintenance of the vehicle, scheduled maintenance of the vehicle, brake pad condition of the vehicle, status of one or more vehicle lights, engine temperature of the vehicle, mileage of the vehicle, one or more wheels of the vehicle, one or more tires of the vehicle, tire wear of one or more tires of the vehicle, tire pressure of one or more tires of the vehicle, speed of the vehicle, statistics regarding different speeds of the vehicle over time, one or more fluid levels of the vehicle, condition or status of an electrical energy storage device of the vehicle, a dashboard of the vehicle, a dashboard display of the vehicle, a current state of a dashboard display of the vehicle, configurable settings of a customizable dashboard display of the vehicle, information stored on a computer readable medium coupled to a portable electrical energy storage device of the vehicle, configurable vehicle lighting, configurable vehicle lighting status, configurable vehicle lighting settings, current odometer reading of the vehicle, historical usage statistics of the vehicle, historical usage statistics regarding a electrical energy storage device of the vehicle, historical usage statistics regarding a motor of the vehicle, historical usage statistics regarding efficiency of the vehicle, geographic travel statistics of the vehicle, a current location of the vehicle, previous locations of the vehicle, target efficiency of the vehicle, recommended settings of the vehicle, user account settings of a user associated with the vehicle, portable electrical energy storage devices for the vehicle, available portable electrical energy storage devices for the vehicle, locations of one or more available portable electrical energy storage devices for the vehicle, one or more collection and distribution machines for portable electrical energy storage devices for the vehicle, portable electrical energy storage device exchange history at one or more collection and distribution machines for portable electrical energy storage devices for the vehicle, and locations of one or more collection and distribution machines for portable electrical energy storage devices for the vehicle.

For example, information regarding usage history of the vehicle 100*a* may include, but is not limited to, the current location of the vehicle 100*a* or mobile device 420, the roads and driving routes previously taken to particular collection and distribution machines from the current location of the vehicle 100*a* or mobile device 420, preferred routes of the vehicle user, historical driving routes of the vehicle user, the current direction of travel of the vehicle user, and historical driving routes of the vehicle user determined using portable electrical energy storage device exchanges which occurred at various collection and distribution machines (e.g., collection and distribution kiosks 508*a*, 508*b*, 508*c* and 508*d*), operating conditions of the vehicle, including speed, acceleration, and frequency, etc.

The vehicle component and system information management system 502 is in operable communication with the collection and distribution kiosks 508*a*, 508*b*, 508*c* and 508*d*, and one or more user mobile electronic devices 420, such that data may be exchanged between the vehicle component and system information management system 502, the collection and distribution kiosks 508*a*, 508*b*, 508*c* and 508*d*, and the user mobile electronic device 420. In some embodiments, such data exchange may be accomplished by directly or indirectly communicable coupling some or all of: the vehicular control system 130, the collection and distribution kiosks 508a, 508b, 508c and 508d, the mobile electronic device 420, and the vehicle component and system information management system 502.

This communication between the various items, systems and entities of FIG. 5 is enabled by the various communications subsystems of these various items, systems and entities. For example, this communication may be enabled by the various communications subsystems of the distribution kiosks 508a, 508b, 508c and 508d, the vehicle component and system information management system 502, the vehicles 100a and 100b, and the user mobile communications device 420. One or more of such communication subsystems may provide wired or wireless communications (e.g., cellular, local area network connections, and/or short range wireless connections using or being compatible with any operable communications protocol and/or standard). The communications subsystems of the items in FIG. 5 may include one or more ports, wireless receivers, wireless transmitters or wireless transceivers to provide wireless signal paths to the various remote components or systems. The remote communications subsystems may include one or more bridges or routers suitable to handle network traffic including switched packet type communications protocols (TCP/IP), Ethernet or other networking protocols.

For example, the vehicle component and system information management system 502 may receive an update from collection and distribution kiosk 508c regarding vehicular component or system data provided by the nontransitory storage media physically coupled to the respective vehicular component or system, diagnostics or status of the vehicle 100b, or usage history of the vehicle 100b. In some embodiments, the vehicle component and system information management system 502 may continually or periodically monitor the collection and distribution kiosks or other items shown in FIG. 5 to obtain such information. Also, the collection and distribution kiosks may continually or periodically provide updates to the vehicle component and system information management system 502 using vehicle information obtained during normal operation of the kiosk. This information may be provided to mobile device 420, vehicle 100a, and/or vehicle 100b continuously, periodically, aperiodically or in response to a request for such information from mobile device 420, vehicle 100a, and/or vehicle 100b. For example, vehicle information regarding vehicle 100a may be provided to mobile device 420, vehicle 100a, and/or vehicle 100b in response to the mobile device 420 or vehicle 100a or 100b being detected by the vehicle component and system information management system 502, or by collection and distribution kiosk 508a, as being within close proximity to collection and distribution machine 508a.

An alert may be sent to the mobile device 420 or vehicle 100a (e.g., via a text message, email, instant message, status update on a social media network, automated phone call, as a notification within a specific application, etc.) regarding diagnostics or status of the vehicle 100a (e.g., portable electrical energy storage device charge level, vehicle component or system status, vehicle component or system maintenance warnings, unsuitable or unauthenticated vehicular components or systems present on the vehicle, offers, promotions) etc., based on the vehicle information. This alert may be sent via any variety of communications channels including, but not limited to, cellular telephone networks, computer wireless fidelity (Wi-Fi) networks, satellite networks, short range wireless signals, etc., or any operable combination thereof.

The alert may also include a selectable link, icon or other user interface element that the user may select to reserve the available portable electrical energy storage device associated with the alert or select to receive further information regarding resolving a maintenance issue or otherwise act on the information communicated in the alert. For example, once the element is selected, information representing the reservation is communicated to the vehicle component and system information management system 502, the respective collection and distribution kiosk at which the portable electrical energy storage device is available, or a service center or location where suitable vehicular components or systems may be obtained by the vehicle user. This reservation information is stored in a database of reservations maintained centrally by the vehicle component and system information management system 502 or locally at the selected collection and distribution kiosk.

Any item of FIG. 5 may identify, authenticate, verify or otherwise facilitate such operations via the user interface of the vehicle, the mobile device, and/or or collection and distribution kiosk by the vehicle user inputting particular user credentials, a password, biometric data, the user identification number or code to the user interface 450 on the respective kiosk 508. Also, any item of FIG. 5 may additionally or alternatively identify, authenticate, verify or otherwise facilitate such operations via information received from a user security token (not shown), mobile device 420 or other item logically associated with the vehicle user. The information regarding the vehicle 100 may be communicated and organized in any manner including in a list, as a group of selectable icons, etc., that indicates information based on the vehicle data.

In some embodiments, various options and features regarding changing settings or configurations of the vehicle 100 may be communicated to or from the mobile device 420 to accomplish changes, updates, or authentication of various vehicular components, systems, configurations, or settings. For example, such changes may be selected by the vehicle user via the mobile device 420 and then communicated to the vehicle 100 though one or more of the various channels and networks described herein.

In some embodiments, various options and features regarding available portable electrical energy storage devices, replacement components or systems, customization components or systems, or upgrade components or systems may be generated and made available to the vehicle user. For example, a user's historical route information or historical vehicle performance information may be utilized by the vehicle component and system information management system 502 to anticipate vehicle maintenance issues, to predict normal wear of components or systems, or to anticipate which collection and distribution kiosks the user is more likely to visit to obtain replacement power storage devices. Information regarding resolving the anticipated vehicle maintenance issues or availability of charged portable electrical energy storage devices at these particular collection and distribution kiosks may be communicated to the vehicle user automatically as the maintenance issues arise or as these portable electrical energy storage devices become available at a kiosk frequented by the vehicle user (e.g., by sending an alert to the vehicle user).

Figure 6:
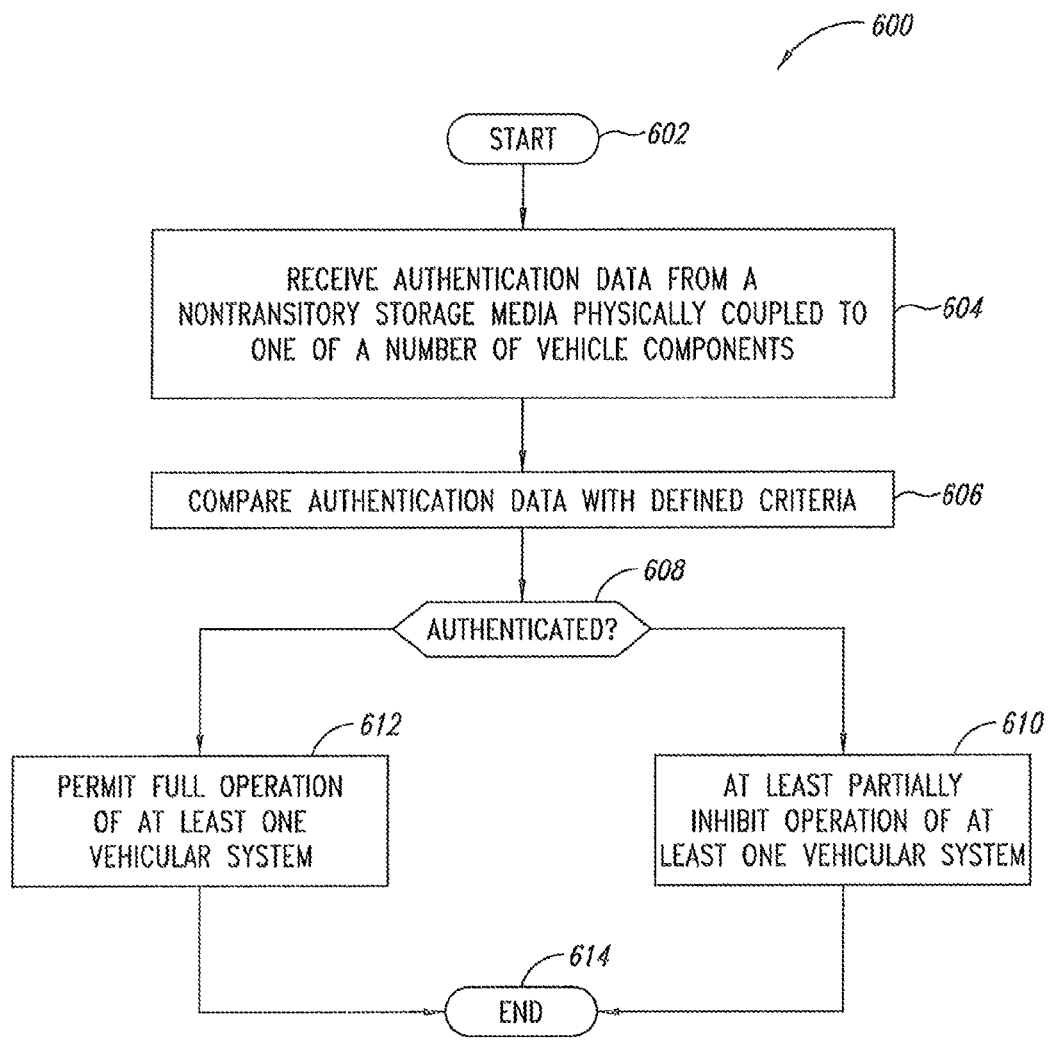
FIG. 6 is a high level flow diagram of an illustrative component authentication method performed by an onboard vehicle controller, according to one non-limiting illustrated embodiment.

FIG. 6 shows a high level method 600 of performing an authentication of a number of vehicular components or systems on a vehicle 100. Every vehicle may be considered the operational sum of the individual vehicular components and systems used in the construction of the vehicle. Once a vehicle is delivered to a customer, the user may replace, customize or upgrade some or all of the components on a vehicle in response to routine wear, damage, or theft. In other instances, a user may desire to distinguish their vehicle from others through the use of customization parts. In other instances, a user may desire to improve the performance of their vehicle through the use of upgrade parts such as parts that enhance one or more aspects of vehicle performance. Thus, the collection of vehicular components or systems included on a vehicle after delivery to a user may not be the same and in fact, may be quite different than the collection of vehicular components or systems provided by the manufacturer or OEM supplier. In order to ensure the safety and performance of a vehicle and also to ensure that a vehicle remains compliant with local, state and federal requirements, a manufacturer or OEM supplier may periodically inventory the various vehicular components or systems coupled to a particular vehicle. Such an inventory may be conducted by transferring or communicating digital data stored in nontransitory storage media physically coupled to the vehicular components or systems to the on-board control system 130. Once collected, at least some of the digital data representative of the vehicular component or system inventory may be used by the control system 130 to authenticate the vehicular components and systems. Such authentication may be used to ensure the vehicle remains safe and performs at an expected level. Such authentication may be used to ensure the vehicle remains compliant with one or more local, state or federal regulations. Such authentication may be used to ensure the vehicle remains compliant with one or more vehicle manufacturer or OEM guidelines, recommendations, or requirements. The method 600 commences at 602.

At 604, the on-board control system 130 wiredly or wirelessly obtains digital data indicative of authentication information from the nontransitory storage media physically coupled to some or all of the vehicular components or systems. Such authentication information may be placed in the nontransitory storage media by the manufacturer or OEM supplier responsible for producing, manufacturing, or supplying the vehicular component or system. Such authentication information may identify a type or class of vehicular component or system (e.g., the part or model number of the vehicular component or system) with or without uniquely identifying the specific vehicular component or system (e.g., the serial number of the vehicular component or system). The collection by the on-board control system 130 of authentication information from the nontransitory storage media physically coupled to the vehicular components or systems may occur at a defined point (e.g., at vehicle start up); at a defined, regular, interval (e.g., every 10 hours of vehicle operation); at the occurrence of a defined event (e.g., every time a battery is changed in an electric vehicle); or any combination thereof. The digital data indicative of the authentication information provided by the vehicular components or systems may be stored in the machine readable nontransitory storage 132 communicably coupled to the on-board control system 130.

At 606, the on-board control system 130 compares the collected authentication data with one or more defined criteria. The one or more defined criteria may include, but are not necessarily limited to, comparing the collected authentication information with reference compatibility or authentication information contained in one or more data stores or data sets. Such reference compatibility or authentication information may be provided or otherwise generated by the vehicle manufacturer or an OEM supplier. In at least some implementations, all or a portion of the data stores or data sets containing such reference compatibility or authentication information may be maintained in the machine readable nontransitory storage 132 communicably coupled to the on-board control system 130. In other implementations, all or a portion of the data stores or data sets containing such reference compatibility or authentication information may be stored or otherwise retained in a nontransitory memory in a remote back end or back office system 430 that is maintained by the vehicle manufacturer or OEM supplier. In at least some instances, the reference compatibility or authentication information may be periodically updated to include vehicular components or systems released subsequent to the manufacture of the vehicle 100. Such reference compatibility or authentication information may indicate vehicular components or systems suitable for use with the identified components or systems coupled to the vehicle 100. Such reference compatibility or authentication information may also indicate whether the identified vehicular components or systems currently coupled to the vehicle are compliant with manufacturer or the OEM supplier recommendations, guidelines, or requirements. Such reference compatibility or authentication information may also indicate whether the identified vehicular components or systems currently coupled to the vehicle are compliant with current local, state, and federal standards, guidelines or requirements.

At 608, the on-board control system 130 determines an authentication state of some or all of the vehicular components and systems currently installed on the vehicle. Such authentication states may include any number of states ranging from no determined compliance between any installed vehicular components or systems and the reference vehicular components or systems, to full determined compliance between all installed vehicular components or systems and the reference vehicular components or systems. In at least some instances, the authentication state may be determined at least in part based upon multiple criteria, for example a defined criticality of the vehicular component or system and the deviation of such vehicular components or systems from the reference vehicular components or systems. Using such a determination, a number of deviations between vehicular components or systems and the reference vehicular components or systems of a non-critical nature may still result in the control system 130 determining a favorable authentication state for the vehicle or one or more vehicular systems. On the other hand, few deviations between vehicular components or systems and the reference vehicular components or systems of a critical nature may result in the on-board control system 130 determining an unfavorable authentication state for the vehicle or one or more vehicular systems. In at least one implementation, the control system 130 can determine, based on authentication information provided by some or all of the vehicular components or systems, whether the vehicle is in at least one of a favorable authentication state or an unfavorable authentication state.

At 610, if the on-board control system 130 determines the vehicle is in an unfavorable authentication state, the operation of at least one vehicular system can be at least partially inhibited. In some instances, the degree to which the operation of a vehicular system is inhibited may be based at least in part vehicular components or systems causing the unfavorable authentication state. For example, a determination that a suspension component is unsuitable for use with the vehicle may result in the operation of the vehicle powertrain being inhibited such that the maximum speed attainable by the vehicle is limited to 20 km/hr or less. A determination that the current battery coupled to the vehicle contains less than a full charge may result in the operation of the vehicle powertrain being inhibited such that the maximum speed attainable by the vehicle is limited to 40 km/hr or less to maintain the operation of the vehicle powertrain in the most energy efficient state to increase the distance attainable using the current battery. On the other hand, a determination that one or more critical safety systems are inoperable may result in the complete inactivation of the vehicle ignition, thereby preventing use of the vehicle until the critical safety system is restored.

At 612, if the on-board control system 130 determines the vehicle is in a favorable authentication state, the full operation of at least one vehicular system can be permitted. The method 600 concludes at 614.

Figure 7:
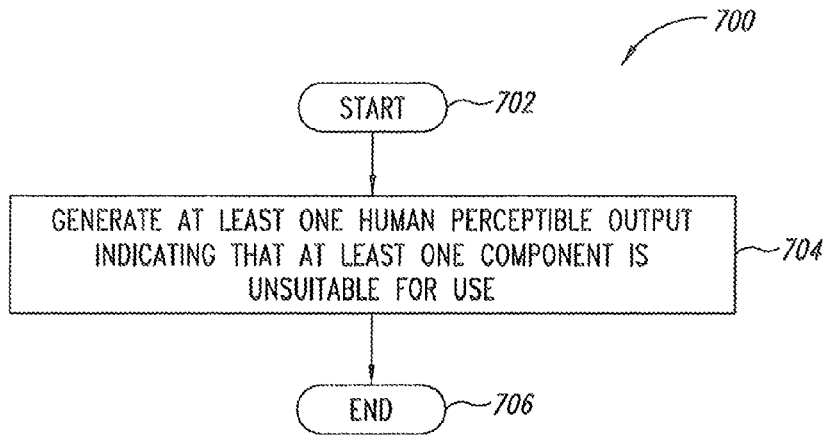
FIG. 7 is a high level flow diagram of an illustrative component authentication method performed by an onboard vehicle controller that is capable of providing at least one human perceptible output indicative of an outcome of the authentication process, according to one non-limiting illustrated embodiment.

FIG. 7 shows a high level method 700 of providing a human perceptible output if the on-board control system 130 determines at least one vehicular component or system is unsuitable for use with the vehicle 100. The method 700 may be used in conjunction with the method 600 discussed above to provide the vehicle user with an indication of why the operation of at least one vehicular system has been at least partially inhibited by the on-board control system 130. The system commences at 702.

At 704, responsive to the determination by the control subsystem that at least one vehicular component or system is unsuitable for use with the vehicle 100, the on-board control system 130 may generate via a user interface one or more audible or visual indications to alert the vehicle user that the operation of at least one vehicular system has been at least partially inhibited by the on-board control system 130. In at least some implementations, the audio or visual indication may be provided on a user interface associated with one or more I/O devices 310 on the vehicle 100. In other implementations, the audio or visual indication may be provided on a user interface associated with a mobile electronic device 420 logically associated with the vehicle user.

In at least some implementations, in addition to the audible or visual indication that at least one vehicular system has been at least partially inhibited by the control system 130, additional information may be provided to the user. In one implementation, the additional information may include manufacturer or OEM supplier recommendations for replacement vehicular components or systems suitable for use with the vehicle 100 that are provided by the on-board control system 130 or by a communicably coupled remote back end or back office system 430. In another implementation, the additional information may include related products or services that may be of interest to the vehicle user that are provided by the on-board control system 130 or by a communicably coupled remote back end or back office system 430. The method 700 concludes at 706.

Figure 8:
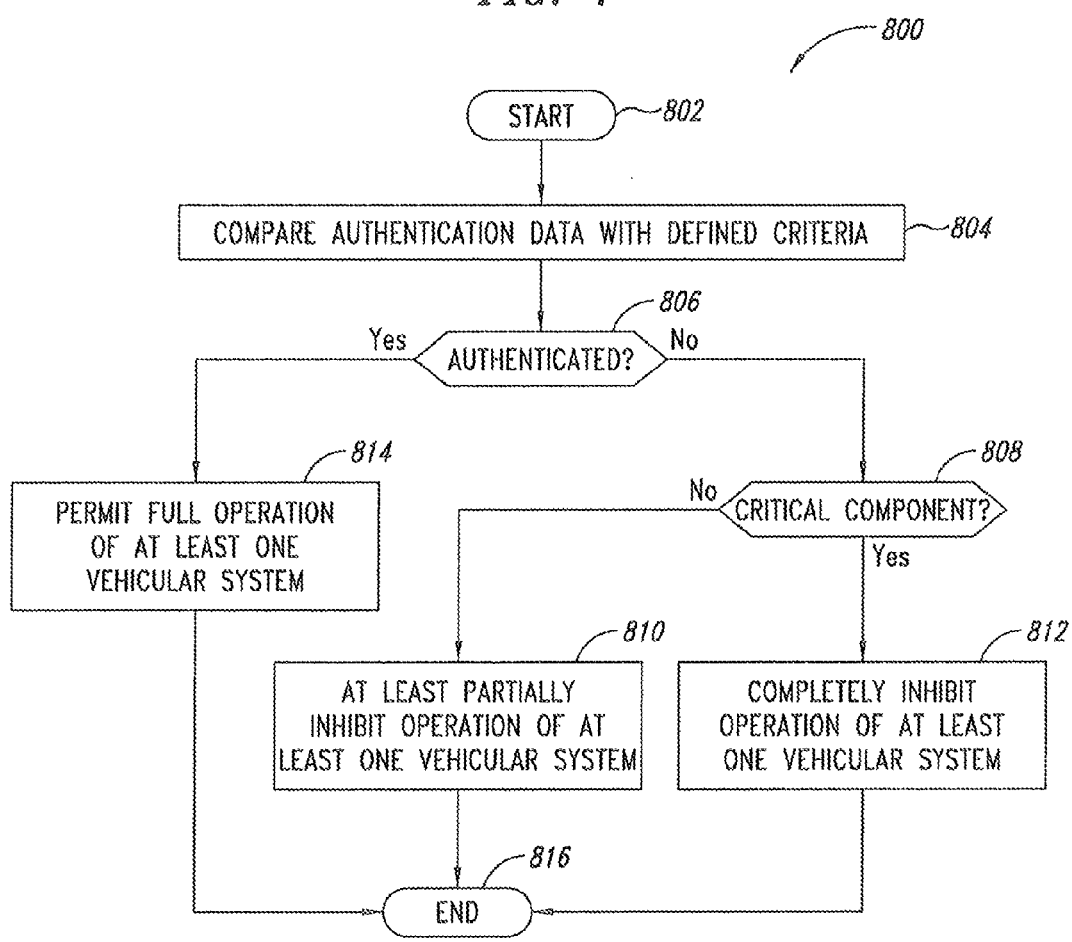
FIG. 8 is a high level flow diagram of an illustrative component authentication method performed by an onboard vehicle controller in which an unsuitable critical component completely inhibits the operation of at least one vehicular system, according to one non-limiting illustrated embodiment.

FIG. 8 shows a high level method 800 of performing an authentication of a number of vehicular components or systems on a vehicle 100. In at least some instances, the on-board control system 130 can determine whether a vehicular component or system that has been deemed unsuitable for use with the vehicle 100 represents a critical component. Such critical components or systems may be related to one or more aspects of vehicle operation that potentially impact user safety, environmental compliance, or compliance with local, state or federal regulations. If the on-board control system 130 determines the vehicular component or system that has been deemed unsuitable for use with the vehicle 100 is a critical component, the on-board control system 130 may completely inhibit the operation of at least one vehicular system. If the on-board control system 130 determines the vehicular component or system that has been deemed unsuitable for use with the vehicle 100 is not a critical component, the on-board control system 130 may at least partially inhibit the operation of at least one vehicular system. The method 800 commences at 802.

At 804, the on-board control system 130 compares authentication data collected from the nontransitory storage media physically coupled to the vehicular components or system with one or more defined criteria. The one or more defined criteria may include, but are not necessarily limited to, comparing the collected authentication information with reference compatibility or authentication information contained in one or more data stores or data sets. Such reference compatibility or authentication information may be provided or otherwise generated by the vehicle manufacturer or an OEM supplier. In at least some implementations, all or a portion of the data stores or data sets containing such reference compatibility or authentication information may be maintained in the machine readable nontransitory storage 132 communicably coupled to the control system 130. In other implementations, all or a portion of the data stores or data sets containing such reference compatibility or authentication information may be stored or otherwise retained in a nontransitory memory in a remote back end or back office system 430 that is maintained by the vehicle manufacturer or OEM supplier. In at least some instances, the reference compatibility or authentication information may be periodically updated to include vehicular components or systems released subsequent to the manufacture of the vehicle 100. Such reference compatibility or authentication information may indicate vehicular components or systems suitable for use with the identified components or systems coupled to the vehicle 100. Such reference compatibility or authentication information may also indicate whether the identified vehicular components or systems currently coupled to the vehicle are compliant with manufacturer or the OEM supplier recommendations, guidelines, or requirements. Such reference compatibility or authentication information may also indicate whether the identified vehicular components or systems currently coupled to the vehicle are compliant with current local, state, and federal standards, guidelines or requirements.

At 806, the on-board control system 130 determines the authentication state of some or all of the vehicular components and systems currently installed on the vehicle. Such authentication states may include any number of states ranging from no determined compliance between any installed vehicular components or systems and the reference vehicular components or systems, to full determined compliance between all installed vehicular components or systems and the reference vehicular components or systems. In at least some instances, the authentication state may be determined at least in part based upon multiple criteria, for example a defined criticality of the vehicular component or system and the deviation of such vehicular components or systems from the reference vehicular components or systems. Using such a determination, a number of deviations between vehicular components or systems and the reference vehicular components or systems of a non-critical nature may still result in the on-board control system 130 determining a favorable authentication state for the vehicle. On the other hand, few deviations between vehicular components or systems and the reference vehicular components or systems of a critical nature may result in the on-board control system 130 determining an unfavorable authentication state for the vehicle. In at least one implementation, the on-board control system 130 can determine, based on authentication information provided by some or all of the vehicular components or systems, whether the vehicle is in at least one of a favorable authentication state or an unfavorable authentication state.

At 808, if the on-board control system 130 determines the vehicle is in an unfavorable authentication state, the on-board control system 130 or a remote back end or back office system 430 determines whether the vehicular component or system determined unsuitable at 806 and responsible for the unfavorable authentication state represents a critical component. Such a determination may be made by comparing the unsuitable vehicular component or system to data indicative of a defined list of manufacturer or OEM supplier recognized critical components or systems on the vehicle 100. Such manufacturer or OEM supplier recognized critical components or systems may include, but are not limited to, vehicle components or systems related to user safety, environmental performance or compliance with local, state, or federal regulations.

At 810, the operation of at least one vehicular system can be at least partially inhibited responsive to the determination that the vehicular component or system determined unsuitable at 806 and responsible for the unfavorable authentication state does not represent a critical component. In some instances, the degree to which the operation of a vehicular system is inhibited may be based at least in part vehicular components or systems causing the unfavorable authentication state. For example, in response to the determination that a non-critical suspension component is unsuitable for use with the vehicle at 806, the on-board control system 130 may inhibit one or more operational aspects of the powertrain system such that the maximum speed attainable by the vehicle is limited to 20 km/hr or less. In response to the determination that the current battery coupled to the vehicle unsuitably operates at less than a full charge at 806, the on-board control system 130 may inhibit one or more operational aspects of the powertrain system such that the maximum speed attainable by the vehicle is limited to 40 km/hr or less to maintain the operation of the vehicle powertrain in the most energy efficient state thereby increasing the distance attainable using the current, reduced capacity, battery.

At 812, the operation of at least one vehicular system can be completely inhibited responsive to the determination that the vehicular component or system determined unsuitable at 806 and responsible for the unfavorable authentication state represents a critical component. In some instances, the inhibited the vehicular component or system may include the unsuitable component or may be the unsuitable system detected at 806. In other instances, the inhibited the vehicular component or system may include a component or system that differs from the unsuitable component or the unsuitable system detected at 806. For example, a determination that a critical steering component potentially affecting the safety of the user is unsuitable for use with the vehicle, the on-board control system 130 may completely inhibit one or more operational aspects of the ignition or electrical system such that the vehicle cannot be operated until the critical steering component is repaired or replaced.

At 814, responsive to the determination of the on-board control system 130 that the vehicle is in at least one of a number of favorable authentication states, the on-board control system 130 may permit the full operation of at least one vehicular system. The method 800 concludes at 816.

Figure 9:
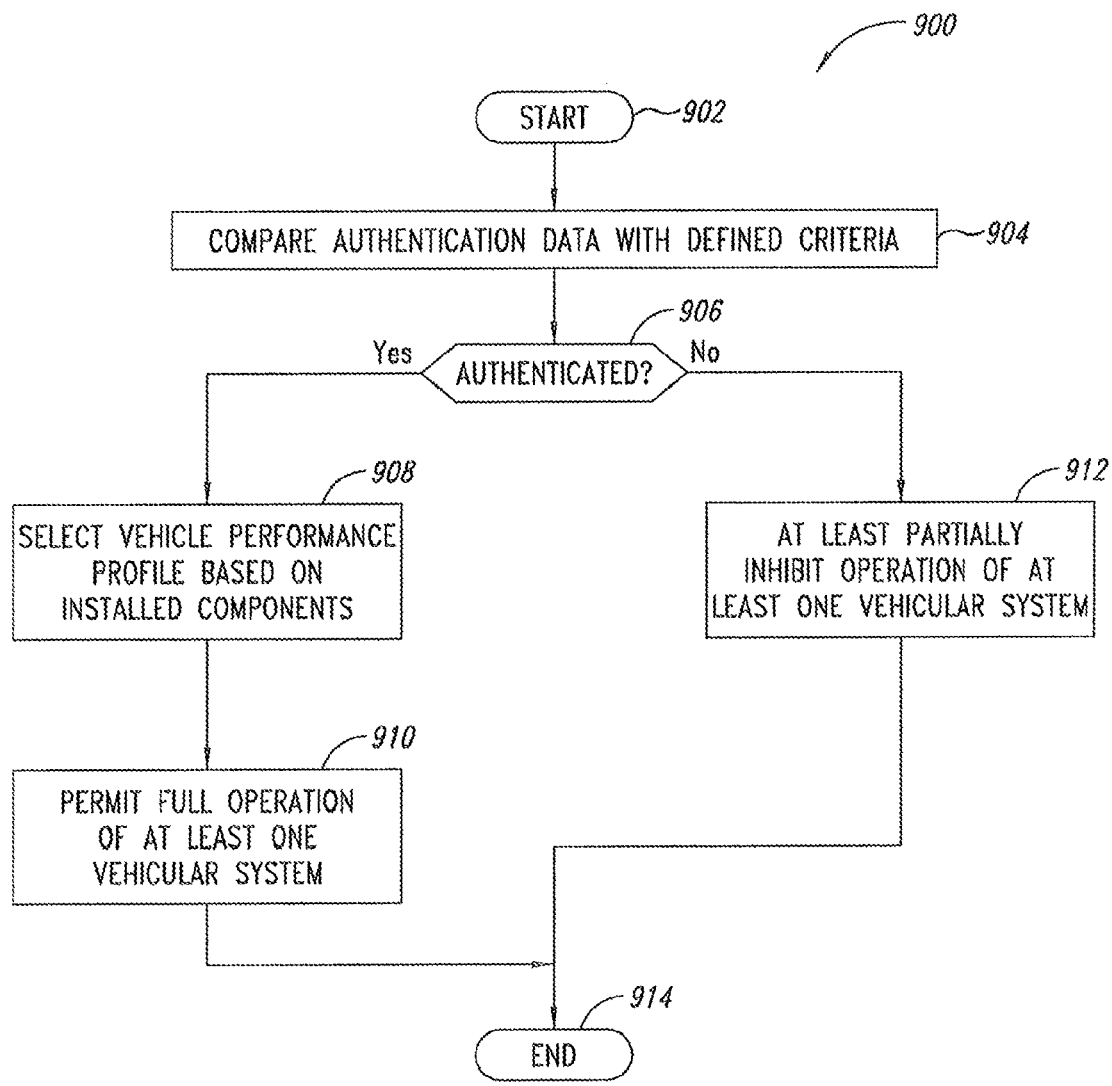
FIG. 9 is a high level flow diagram of an illustrative component authentication method performed by an onboard vehicle controller in which the components in one or more vehicular systems are used to determine an appropriate vehicle performance profile, according to one non-limiting illustrated embodiment.

FIG. 9 shows a high level method 900 of performing an authentication of a number of vehicular components or systems on a vehicle 100. In at least some instances, the on-board control system 130 can select a vehicle performance profile based at least in part on the vehicular components or systems present on the vehicle 100. Such vehicular components or systems may be identified by the on-board control system 130 based upon authentication information provided by the non-transitory storage media physically coupled to the vehicular components or systems. In at least some implementations, the on-board control system 130 may also use other data, for example data indicative of the vehicle user's habits or driving style, or data indicative of prior vehicle performance in selecting an appropriate vehicle performance profile. The vehicle performance profile may define the operational envelope for one or more aspects of one or more vehicular systems. For example, responsive to determining that a high torque electric motor has been installed on a vehicle 100, the on-board control system 130 may alter the acceleration aspect of the powertrain system to permit a steeper acceleration curve than would be provided if a standard (i.e., non-high torque) motor were installed in the vehicle. The method 900 commences at 902.

At 904, the on-board control system 130 compares authentication data collected from the nontransitory storage media physically coupled to the vehicular components or system with one or more defined criteria. The one or more defined criteria may include, but are not necessarily limited to, comparing the collected authentication information with compatibility or authentication information contained in one or more data stores or data sets. Such reference compatibility or authentication information may be provided or otherwise generated by the vehicle manufacturer or an OEM supplier. In at least some implementations, all or a portion of the data stores or data sets containing such reference compatibility or authentication information may be maintained in the machine readable nontransitory storage 132 communicably coupled to the on-board control system 130. In other implementations, all or a portion of the data stores or data sets containing such reference compatibility or authentication information may be stored or otherwise retained in a nontransitory memory in a remote back end or back office system 430 that is maintained by the vehicle manufacturer or OEM. In at least some instances, the reference compatibility or authentication information may be periodically updated to include vehicular components or systems released subsequent to the manufacture of the vehicle 100. Such reference compatibility or authentication information may indicate vehicular components or systems suitable for use with the identified components or systems coupled to the vehicle 100. Such reference compatibility or authentication information may also indicate whether the identified vehicular components or systems currently coupled to the vehicle are compliant with manufacturer or the OEM supplier recommendations, guidelines, or requirements. Such reference compatibility or authentication information may also indicate whether the identified vehicular components or systems currently coupled to the vehicle are compliant with current local, state, and federal standards, guidelines or requirements.

At 906, the on-board control system 130 determines the authentication state of some or all of the vehicular components and systems currently installed on the vehicle. Such authentication states may include any number of states ranging from no determined compliance between any installed vehicular components or systems and the reference vehicular components or systems, to full determined compliance between all installed vehicular components or systems and the reference vehicular components or systems. In at least some instances, the authentication state may be determined at least in part based upon multiple criteria, for example a defined criticality of the vehicular component or system and the deviation of such vehicular components or systems from the reference vehicular components or systems. Using such a determination, a number of deviations between vehicular components or systems and the reference vehicular components or systems of a non-critical nature may still result in the on-board control system 130 determining a favorable authentication state for the vehicle. On the other hand, few deviations between vehicular components or systems and the reference vehicular components or systems of a critical nature may result in the on-board control system 130 determining an unfavorable authentication state for the vehicle. In at least one implementation, the on-board control system 130 can determine, based on authentication information provided by some or all of the vehicular components or systems, whether the vehicle is in at least one of a favorable authentication state or an unfavorable authentication state.

At 908, if the on-board control system 130 determines the vehicle is in a favorable authentication state, the on-board control system 130 or remote back end or back office system 430 can determine or otherwise select a vehicle performance profile for the vehicle 100. In at least some implementations, the vehicle performance profile may be determined or otherwise selected by the on-board control system 130 or a remote back end or back office system 430 based at least in part on one or more vehicular components or systems identified by the authentication information provided by the nontransitory storage media physically coupled to the respective component or system. In at least some implementations, the on-board control system 130 or remote back end or back office system 430 may use at least in part, data indicative of one or more aspects of the driving habits of the vehicle user to determine or otherwise select a vehicle performance profile. In at least some implementations, the on-board control system 130 or remote back end or back office system 430 may use at least in part, data indicative of one or more aspects of the vehicle use or performance history to determine or otherwise select a vehicle performance profile. For example, responsive at least in part to receipt of authentication information indicative of a high performance battery, ignition, and motor in an electric vehicle, and responsive at least in part to receipt of data indicative of the vehicle user's desire for rapid acceleration, the on-board control system 130 or remote back end or back office system 430 may select a vehicle performance profile permitting a steeper acceleration curve at the expense of battery life.

At 910, responsive to the determination that the vehicle is in at least one of a number of favorable authentication states by the on-board control system 130 and responsive to the determination or selection of a vehicle performance profile by the on-board control system 130 or remote back end or back office system 430, the on-board control system 130 may permit operation of one or more vehicular components or systems within the performance envelope defined by the selected vehicle performance profile.

At 912, the operation of at least one vehicular system can be at least partially inhibited responsive to the detection of an unsuitable vehicular component or system and consequent to the determination of at least one unfavorable authentication state at 906. In some instances, the degree to which the operation of a vehicular system is inhibited may be based at least in part on the detected unsuitable vehicular components or systems causing or otherwise creating the unfavorable authentication state. For example, in response to the determination that a non-critical suspension component is unsuitable for use with the vehicle at 906, the on-board control system 130 may inhibit one or more operational aspects of the powertrain system such that the maximum speed attainable by the vehicle is limited to 20 km/hr or less. In response to the determination that the current battery coupled to the vehicle unsuitably operates at less than a full charge at 906, the on-board control system 130 may inhibit one or more operational aspects of the powertrain system such that the maximum speed attainable by the vehicle is limited to 40 km/hr or less to maintain the operation of the vehicle powertrain in the most energy efficient state thereby increasing the distance attainable using the current, reduced capacity, battery. The method 900 concludes at 914.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/511,887, entitled "THERMAL MANAGEMENT OF COMPONENTS IN ELECTRIC MOTOR DRIVE VEHICLES" and filed Jul. 26, 2011; U.S. provisional patent application Ser. No. 61/783,041, entitled "APPARATUS, SYSTEM, AND METHOD FOR AUTHENTICATION OF VEHICULAR COMPONENTS" and filed Mar. 14, 2013; and U.S. provisional patent application Ser. No. 61/511,880, entitled "DYNAMICALLY LIMITING VEHICLE OPERATION FOR BEST EFFORT ECONOMY" and filed Jul. 26, 2011; are incorporated herein by reference, in their entirety. Aspects of the embodiments can be modified, if necessary, to employ systems, circuits and concepts of the various patents, applications and publications to provide yet further embodiments.

While generally discussed in the environment and context of collection and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A system for authenticating a first plurality of components operably coupled to a vehicle via a first authentication method and authenticating a second plurality of components operably coupled to the vehicle via a second authentication method that differs from the first authentication method, wherein the first plurality of components and the second plurality of components include at least one different component, and wherein a portable electrical power storage device is common to both the first plurality and the second plurality of components, the system comprising:
a vehicle controller;
at least one communications interface communicably coupled to the vehicle controller, a non-rewriteable portion of a respective nontransitory storage media carried by each of the first plurality of components, and a respective nontransitory storage media carried by each of the second plurality of components;
at least one controller-readable, nontransitory, storage communicably coupled to the vehicle controller and having stored therein at least data indicative of a manufacturer-specific authentication string used in the first authentication method, data indicative of a vehicle-specific authentication code used in the second authentication method, and at least one machine executable instruction set that when executed by the vehicle controller, causes the vehicle controller to:
authenticate each of the first plurality of components via the first authentication method by causing the vehicle controller to:
generate an authentication seed;
communicate the authentication seed to each of the components included in the first plurality of components;
determine, based at least in part on the data indicative of the manufacturer-specific authentication string and the authentication seed, a valid, manufacturer-specific, authentication code used in the first authentication method;
receive authentication data from each of the first plurality of components, the authentication data generated by each of the first plurality of components using the authorization seed and a manufacturer-specific authentication string stored in a non-rewriteable portion of the nontransitory storage media carried by the respective component;
validate the authentication data provided by each of the components included in the first plurality of components using the valid manufacturer-specific, authentication code determined by the vehicle controller; and
at least partially inhibit operation of at least one vehicular system responsive to an unsuccessful validation of the authentication data provided by at least one of the components included in the first plurality of components; and
authenticate each of the second plurality of components via the second authentication method by causing the vehicle controller to:
responsive to receiving a request to enable vehicle operation, receive data indicative of a vehicle-specific authentication code from a respective nontransitory storage media carried by each component included in the second plurality of components, the vehicle-specific authentication code stored in a selectively rewriteable portion of the nontransitory storage media carried by the portable electrical power storage device;
validate at least a portion of the vehicle-specific authentication code received from each component in the second plurality of components against the vehicle-specific authentication code stored in the at least one controller-readable, nontransitory, storage; and
inhibit operation of the vehicle responsive to an unsuccessful validation of the vehicle-specific authentication code received from at least one component included in the second plurality of components.

2. The system of claim 1 wherein the data indicative of the manufacturer-specific authentication string includes data indicative of a manufacturer-specific key assigned by at least one of a vehicle manufacturer or an original equipment supplier.

3. The system of claim 2 wherein the data indicative of the authentication seed comprises a random number.

4. The system of claim 1 wherein the respective nontransitory storage media carried by each of the first plurality of components comprises a non-rewriteable nontransitory storage media carried by one or more of the following components: the vehicle controller, the portable electrical power storage device, and a vehicular power system control device.

5. The system of claim 4 wherein respective nontransitory storage media carried by each of the second plurality of components comprises nontransitory storage media carried by one or more of the following components: the vehicle controller, the portable power storage device, and a vehicular key or keyfob.

6. The system of claim 5 wherein the portable electrical power storage device an consists of a non-vehicle specific, replaceable, electrical charge storage device; and
wherein the nontransitory storage media carried by the non-vehicle specific, interchangeable electrical charge storage device comprises a non-rewriteable portion in which data indicative of a manufacturer-specific authentication string is stored and a selectively rewriteable portion in which data indicative of a vehicle-specific authentication code is stored.

7. The system of claim 1 wherein the at least one machine executable instruction set further causes the vehicle controller to:
compare the authentication data received from each of the components included in the first plurality of components with one or more defined criteria to determine a suitability for each of at least a portion of the first plurality of components for use with the vehicle;
at least partially inhibit operation of at least one vehicular system responsive to the determination that at least one of the first plurality of components is not suitable for use with the vehicle; and
permit operation of the at least one vehicular system responsive to the determination that each of the first plurality of components is suitable for use with the vehicle.

8. The system of claim 7, further comprising at least one human perceptible output device, wherein the machine executable instruction set, when executed by the vehicle controller, further causes the vehicle controller to provide via the at least one human perceptible output device at least one of: a human perceptible audible output or a human perceptible visual output responsive to at least partially inhibiting operation of the at least one vehicular system.

9. The system of claim 7 wherein the machine executable instruction set, when executed by the vehicle controller, further causes the vehicle controller to:
inhibit operation of the vehicle responsive to the determination that at least one of a number of defined critical vehicular components included in the first plurality of components is not suitable for use with the vehicle based at least in part on the authentication data provided by the nontransitory storage media carried by the respective critical vehicular component.

10. The system of claim 7 wherein the machine executable instruction set, when executed by the vehicle controller, further causes the vehicle controller to:
select a vehicle performance profile responsive to the determination that the number of components comprising the at least one vehicular system and included in the first plurality of components are suitable for use with the selected vehicle performance profile based at least in part on the authentication data provided by each respective one of the number of vehicular components comprising the at least one vehicular system.

11. The system of claim 7 wherein at least some of the components included in the first plurality of components further comprise a wireless communications interface communicably coupled to the nontransitory storage media carried by the respective component, the wireless communications interface communicably coupleable to the at least one communications interface communicably coupled to the vehicle controller.

12. The system of claim 11 wherein at least some of the components included in the second plurality of components further comprise a wireless communications interface communicably coupled to the nontransitory storage media carried by the respective component, the wireless communications interface communicably coupleable to the at least one communications interface communicably coupled to the vehicle controller.

13. The system of claim 12 wherein the communications interface communicably coupled to the nontransitory storage media carried by at least some of the components included in the first plurality of components comprises at least one of: a radio frequency identification ("RFID") interface, or a near field communications ("NFC") interface; and
wherein the communications interface communicably coupled to the nontransitory storage media carried by at least some of the components included in the second plurality of components comprises at least one of: an RFID interface, or an NFC interface.

14. The system of claim 7 wherein at least some of the components included in the first plurality of components further comprise a wired communications interface communicably coupled to the nontransitory storage media carried by the respective component, the wired communications interface communicably coupleable to the communications interface communicably coupled to the vehicle controller.

15. A method for authenticating components operably coupled to a vehicle, the method comprising:
generating, by a vehicle controller, data indicative of an authentication seed;
determining, by the vehicle controller, a valid manufacturer-specific authentication code based at least in part on the data indicative of the authentication seed and data indicative of a manufacturer-specific authentication string;
transmitting via a communications interface communicably coupled to the vehicle controller, the data indicative of the authentication seed to a respective nontransitory storage media carried by each component included in a first plurality of components, the first plurality of components including a portable electrical power storage device;
receiving authentication data returned by each of the components included in the first plurality of components, the authentication data generated at least in part using data indicative of the manufacturer-specific authentication string stored in a non-rewriteable portion of the nontransitory storage media carried by each respective component included in the first plurality of components and the data indicative of the authentication seed; and
validating, by the vehicle controller, the authentication data returned by each of the components included in the first plurality of components using at least in part valid manufacturer-specific authentication code determined by the vehicle controller;
at least partially inhibiting, by the vehicle controller, an operation of at least one vehicular system responsive to a failure to validate the authentication data received from at least one of the components included in the first plurality of components;
responsive to receiving a request to enable vehicle operation, receiving data indicative of a vehicle-specific authentication code from a nontransitory storage media carried by each component included in a second plurality of components, the second plurality of components including the portable electrical power storage device and at least one component not included in the first plurality of components, the vehicle-specific authentication code stored in a selectively rewriteable portion of the nontransitory storage media carried by the portable electrical power storage device;

validating, by the vehicle controller, at least a portion of the vehicle-specific authentication code received from each component included in the second plurality of components; and inhibiting, by the vehicle controller, operation of the vehicle responsive to an unsuccessful validation of the vehicle-specific authentication code received from at least one of the components included in the second plurality of components.

16. The method of claim 15 wherein transmitting via a communications interface communicably coupled to the vehicle controller, data indicative of the authentication seed from the vehicle controller to the nontransitory storage media carried by each of the components included in the first plurality of components includes:

transmitting via a communications interface communicably coupled to the vehicle controller, data indicative of the authentication seed to the nontransitory storage media carried by the at least one portable electrical power storage device and to the nontransitory storage media carried by a vehicular power system control device.

17. The method of claim 16 wherein receiving data indicative of a vehicle-specific authentication code from a nontransitory storage media carried by each component included in a second plurality of components includes:

receiving data indicative of a vehicle-specific authentication code from the selectively rewriteable portion of the nontransitory storage media carried by the at least one portable electrical power storage device and from the nontransitory storage media carried by a vehicular key or keyfob.

18. The method of claim 15 wherein generating, by the vehicle controller, data indicative of the authentication seed includes;

generating, by the vehicle controller, data indicative of a random number.

19. A non-transitory computer readable medium containing instructions that, when executed by a vehicular controller, cause the vehicular controller to:

generate data indicative of an authentication seed;

determine a valid manufacturer-specific authentication code based at least in part on data indicative of the authentication seed and data indicative of a manufacturer-specific authentication string;

transmit data indicative of the authentication seed to a respective nontransitory storage media carried by each component included in a first plurality of components, the first plurality of components including a portable electrical power storage device;

receive authentication data from each component included in the first plurality of components, the received authentication data generated by each respective component at least in part using data indicative of a manufacturer-specific authentication string stored in a non-rewriteable portion of the nontransitory storage media carried by the respective component and the data indicative of the received authentication seed;

validate the authentication data provided by each of the components included in the first plurality of components using at least in part the valid manufacturer-specific authentication code determined by the vehicle controller;

at least partially inhibit an operation of at least one vehicular system responsive to a failure to validate the authentication data received from at least one of the components included in the first plurality of components;

responsive to the receipt of a request to enable vehicle operation, receive data indicative of a vehicle-specific authentication code from a nontransitory storage media carried by each component included in a second plurality of components, the second plurality of components including the portable electrical power storage device and at least one other component not included in the first plurality of components, the vehicle-specific authentication code stored in a selectively rewriteable portion of the nontransitory storage media carried by the portable electrical power storage device;

validate at least a portion of the vehicle-specific authentication code received from each component included in the second plurality of components; and inhibit operation of the vehicle responsive to an unsuccessful validation of the vehicle-specific authentication code received from at least one of the components included in the second plurality of components.

20. The nontransitory computer readable media of claim 19, further comprising instructions that when executed by the vehicular controller, cause the vehicular controller to:

generate at least one human perceptible output responsive to the determination that at least one of a number of components comprising at least one vehicular system is unsuitable for use with a vehicle based at least in part on the received authentication data associated with the respective component.

21. A vehicle controller, comprising:

at least one input to receive manufacturer-specific authentication data from each component included in a first plurality of components operably coupled to a vehicle, the first plurality of components including a portable electrical power storage device, the manufacturer-specific authentication data generated at least in part using data indicative of an authentication seed generated by the vehicle controller and data indicative of a manufacturer-specific authentication string stored in a non-rewriteable portion of a nontransitory storage media carried by each of the components included in the first plurality of components;

a controller-readable nontransitory storage media communicably coupled to the vehicle controller, the controller-readable nontransitory storage media containing one or more sets of machine executable instructions that when executed by the vehicle controller, cause the vehicle controller to:

determine a valid manufacturer-specific authentication code based at least in part on the data indicative of a valid manufacturer-specific authentication string stored in the controller-readable nontransitory storage media and the data indicative of the authentication seed;

validate the manufacturer-specific authentication data provided by each of the components included in the first plurality of components using the valid manufacturer-specific authentication code determined by the vehicle controller;

at least partially inhibit operation of at least one vehicular system responsive to an unsuccessful validation of the authentication data provided by at least one component included in the first plurality of components;

responsive to the receipt of a request to enable vehicle operation, receive data indicative of a vehicle-specific authentication code from a nontransitory storage media carried by each component included in a second plurality of components, the second plurality of components including the portable electrical power storage device and at least one other component not included in the first plurality of components, the vehicle-specific authentication code stored in a selectively rewriteable portion of the nontransitory storage media carried by the portable electrical power storage device;

validate at least a portion of the second authentication code received from each component included in the second plurality of components; and inhibit operation of the vehicle responsive to an unsuccessful validation of the second authentication code received from at least one of the components included in the second plurality of components.

22. The controller of claim 21 wherein the one or more sets of machine executable instructions further cause the controller to:

select a vehicle performance profile responsive to the determination that a number of vehicular components comprising the at least one vehicular system and included in the first plurality of components are suitable for use with the selected vehicle performance profile based at least in part on the authentication data provided by the respective nontransitory storage media carried by the vehicular components comprising the at least one vehicular system.

\* \* \* \* \*

UNITED STATES PATENT AND TRADEMARK OFFICE
CERTIFICATE OF CORRECTION

PATENT NO. : 8,798,852 B1  
APPLICATION NO. : 13/918703  
DATED : August 5, 2014  
INVENTOR(S) : Ching Chen et al.

Page 1 of 1

It is certified that error appears in the above-identified patent and that said Letters Patent is hereby corrected as shown below:

In the Claims

Column 39, Line 8:
"controller, the portable power storage device, and a vehicular" should read, --controller, the portable electrical power storage device, and a vehicular--.

Column 40, Line 55:
"data indicative of the authentication seed; and" should read, --data indicative of the authentication seed;--.

Column 40, Line 58:
"first plurality of components using at least in part valid" should read, --first plurality of components using at least in part the valid--.

Signed and Sealed this
Seventeenth Day of May, 2016

Michelle K. Lee
*Director of the United States Patent and Trademark Office*